(12) United States Patent
Hirata et al.

(10) Patent No.: US 7,595,886 B2
(45) Date of Patent: Sep. 29, 2009

(54) WAVELENGTH MONITOR USING INTERFERENCE SIGNALS

(75) Inventors: Takaaki Hirata, Tokyo (JP); Minoru Maeda, Tokyo (JP); Hironori Takai, Tokyo (JP); Hiroki Saitou, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 182 days.

(21) Appl. No.: 11/473,175

(22) Filed: Jun. 23, 2006

(65) Prior Publication Data

US 2006/0290937 A1 Dec. 28, 2006

(30) Foreign Application Priority Data

Jun. 27, 2005 (JP) ............................ P2005-186185
Oct. 31, 2005 (JP) ............................ P2005-317265

(51) Int. Cl.
*G01B 9/02* (2006.01)

(52) U.S. Cl. ........................................ 356/451; 356/477

(58) Field of Classification Search ................. 356/451, 356/491, 477, 453; 372/32
See application file for complete search history.

(56) References Cited

U.S. PATENT DOCUMENTS

| | | | |
|---|---|---|---|
| 5,018,862 A * | 5/1991 | Aiello | 356/450 |
| 5,172,185 A * | 12/1992 | Leuchs et al. | 356/482 |
| 6,043,883 A | 3/2000 | Leckel et al. | |
| 6,052,179 A * | 4/2000 | Prohaska et al. | 356/73.1 |
| 6,956,653 B1 * | 10/2005 | Lam et al. | 356/477 |
| 2002/0093660 A1 | 7/2002 | Maeda | |
| 2004/0061864 A1 * | 4/2004 | Snyder et al. | 356/477 |
| 2005/0002023 A1 * | 1/2005 | Kreh et al. | 356/237.5 |

FOREIGN PATENT DOCUMENTS

| | | |
|---|---|---|
| JP | 10-253452 A | 9/1998 |
| JP | 10-339668 A | 12/1998 |
| JP | 2000-2349 A | 1/2000 |
| JP | 2002-214049 A | 7/2002 |

* cited by examiner

*Primary Examiner*—Tarifur Chowdhury
*Assistant Examiner*—Michael Lapage
(74) *Attorney, Agent, or Firm*—Sughrue Mion, PLLC

(57) ABSTRACT

A wavelength monitor includes the following elements. An optical divider divides a beam of measured light into first and second divided beams of measured light. An interfering element converts the first and second divided beams of measured light into first and second parallel beams of measured light to cause interference between the first and second parallel beams of measured light with each other thereby generating an interfered beam of measured light. A light receiving element way including a plurality of light receiving elements receives the interfered beam of measured light. An interference signal converting unit receives output signals from the light receiving element array to generate interference signals different in phase by 90 degrees from each other. A signal processing unit receives the interference signals from the interference signal converting unit to obtain a wavelength of the measured light from the interference signals.

17 Claims, 14 Drawing Sheets

US 7,595,886 B2

WAVELENGTH MONITOR USING INTERFERENCE SIGNALS

BACKGROUND OF THE INVENTION

1. Field of the Invention

The present invention generally relates to a wavelength monitor that is adapted to measure a wavelength of a light as a measurement object, for example, a wavelength of a leaser beam emitted in single-mode emission. More specifically, the present invention relates to a wavelength monitor that is adapted to measure a stable-and-noise-reduced interference signal.

Priority is claimed on Japanese Patent Applications No. 2005-186185, filed Jun. 27, 2005 and No. 2005-317265, filed Oct. 31, 2005, the contents of which are incorporated herein by reference.

2. Description of the Related Art

All patents, patent applications, patent publications, scientific articles, and the like, which will hereinafter be cited or identified in the precut application, will hereby be incorporated by reference in their entirety in order to describe more fully the state of the art to which the present invention pertains.

A variety of light emitting devices are used in the fields of optical communication and optical measurement. Typical examples of the light emitting devices may include, but are not limited to, Distributed Feedback Laser Diodes (DFB-LD), Distributed Bragg Reflector Laser Diodes (DBR-LD), and External-Cavity Tunable Laser Diodes using a diffraction grating.

The Distributed Feedback Laser Diodes and the Distributed Bragg Reflector Laser Diodes have long-term drifts of emission wavelength. The External-Cavity Tunable Laser Diodes have thermally unstable wavelengths. Highly accurate and precise measurement and monitoring of the wavelength of the light we necessary for using the light emitting device exhibiting the single mode emission in the fields of optical communication and optical measurement.

Typical examples of the wavelength measuring apparatus may include, but are not limited to, a wavelength monitor with a diffraction grating, and another wavelength monitor that causes an interference of measured lights. Typical examples of the wavelength monitor using interference signals of the measured lights may include, but are not limited to, a wavelength monitor that uses an interference filter, and another wavelength monitor that measures two interference signals, both of which are different in phase by 90 degrees. The two interference signals may be so called as A-phase interference signal and B-phase interference signal.

Japanese Unexamined Patent Application, First Publication No. 10-253452 discloses a configuration of a conventional wavelength monitor. FIG. 13 is a block diagram illustrating a configuration of the conventional wavelength monitor. A beam of measured light to be measured by the wavelength monitor is incident into a cut filter 50. The cut filter 50 allows a selective transmission of the measured light in a predetermined range of wavelength.

The measured light is transmitted through the cut filter 50. The transmitted light is then incident into an interference filter 51. The interference filter 51 has a continuous variation in transmittable wavelength of the measured light over incident positions. A slide adjusting mechanism 52 is configured to mechanically slide the interference filter 51 by a small distance in a direction parallel to an X-axis. Sliding the interference filter 51 causes a continuous variation in wavelength of the light that is transmitted through the interference filter 51.

A photodiode 53 is configured to receive the transmitted light that has been transmitted through the interference filter 51. Another photodiode 54 is configured to receive a reflected light that has been reflected by the interference filter 51. A power ratio calculating unit 55 includes IV converter circuits 55a and 55b, a subtracter 55c, an adder 55d, and a divider 55e. The power ratio calculating unit 55 receives output signals from the photodiodes 53 and 54. The power ratio calculating unit 55 calculates a ratio of power between the photodiodes 53 and 54.

The IV converter circuits 55a and 55b are configured to receive outputs from the photodiodes 53 and 54 and to convert the outputs into voltage signals, respectively. The subtracter 55c is configured to receive the voltage signals from the IV converter circuits 55a and 55b and to perform a subtraction between the voltage signals. The adder 55d is configured to receive the voltage signals from the IV converter circuits 55a and 55b and to perform an addition of the voltage signals. The divider 55e is configured to receive results of operations from the subtracter 55c and the adder 55d and to divide the results of operations thereby normalizing an output ratio. The signal processing unit 56 is configured to receive the output ratio from the divider 55e and to calculate a wavelength of the measured light from the output ratio. In case of the wavelength monitor shown in FIG. 13, a measurable wavelength range and a measurable wavelength accuracy depend on wavelength characteristics of the interference filter 51.

Japanese Unexamined Patent Applications, First Publications No. 2000-234959 and No. 2002-214049 disclose other configurations of conventional wavelength monitors. FIG. 14 is a block diagram illustrating another configuration of the conventional wavelength monitor. An interferometer such as a Michelson interferometer is used to measure two interference signals differing in phase by 90 degrees, for example, A-phase and B-phase interference signals so as to measure a wavelength of the measured light.

In FIG. 14, an input optical fiber 60 transmits a beam of measured light and emits the measured light to a space. A lens 61 converts the measured light into a parallel beam of measured light, wherein the measure light has been emitted from the input optical fiber 60. A half mirror 62 performs as a first beam splitter. The half mirror divides the parallel beam of measured light into divided beams of measured light. The half mirror also couples the divided beams of measured light into a parallel beam of interference light. A first reflector 63 reflects a first one of the divided beams of measured light toward the half mirror 62. A second reflector 64 has a reflecting surface that has a step which dimension is $d=\lambda_0/8$. The second reflector 64 reflects a second one of the divided beams of measured light toward the half mirror 62. The first and second reflectors 63 and 64 are placed so that a reflecting surface of each of the first and second reflectors 63 and 64 is vertical to an optical path of each of the divided beams of measured light, into which the measured light has been divided by the half mirror 62. The divided beams of measured light are transmitted on optical axes toward the first and second reflectors. Then, the divided beams of measured light are then reflected by the first and second reflectors 63 and 64. The reflected beams of measured light are then transmitted on the above optical axes toward the half mirror 62.

A reflecting prism 65 performs as a second beam splitter. The reflecting prism 65 divides the interference light beam into two divided beams of interference light. The reflecting prism 65 is placed so that a top-edge of the reflecting prism 65 is aligned to the step on the optical plane of the second reflector 64. The step on the optical plane provides a $\lambda_0/4$ optical path difference. The first photodiode 66 receives a first one of the two divided beams of interference light from the reflecting prism 65. The second photodiode 67 receives a second one of the two divided beams of interference light from the reflecting prism 65. The signal processing unit 68 calculates a wavelength of the measured light with reference to outputs from the first and second photodiodes 66 and 67.

The following descriptions will be directed to operations of the above-described device.

The measured light is emitted from a light emission edge of the input optical fiber 60 toward a space. The emitted measured light is converted into the parallel beam of measured light by the lens 61. The parallel beam of measured light is incident into the half mirror 62. The parallel beam of measured light is divided into two divided beams of measured light by the half mirror 62. The two divided bears of measured light are transmitted to the first and second reflectors 63 and 64.

The first and second reflectors 63 and 64 reflect the two divided beams of measured light, into which the parallel beam of measured light is divided by the half mirror 62. The second reflector 64 has the reflecting surface that has the step which dimension is $d=\lambda_0/8$. The step causes the optical path difference of $\lambda_0/4$ between first and second half portions of the second one of the divided beams of measured light. $\lambda_0$ is the wavelength, Preferably, the wavelength $\lambda_0$ can be set at a center wavelength of the measured wavelength range. The wavelength $\lambda_0$ can, for examples be set at 1550 nm for optical communication.

The reflected parallel beams of measured light that have been reflected by the first and second reflectors 63 and 64 are then incident into the half mirror 62. The reflected parallel beams of measured light are then coupled with each other to generate a parallel beam of interference light. The parallel beam of interference light is irradiated onto the reflecting prism 65 so that the parallel beam of interference light is divided by the top-edge into two divided beams of interference light. The two divided beams of interference light are different in phase by 90 degrees. The two divided beams of interference light are then incident into the first and second photodiodes 66 and 67. The two divided beams of interference light are converted into current signals by the first and second photodiodes 66 and 67. The current signals correspond to intensities or optical powers of the two divided beams of interference light. The current signals are supplied to the signal processing unit 68.

The signal processing unit 68 compares the intensities of light that have been supplied from the first and second photodiodes 66 and 67. The signal processing unit 68 outputs wavelength-related data. A variation of optical intensity over wavelengths obtained by the Michelson interferometer is given by the following equation (1).

$$I=[1+\cos[2\pi\times\Delta L/\lambda]]/2 \quad (1)$$

where I is the normalized intensity of light that is received by each of the fast and second photodiodes 66 and 67, $\lambda$ is the wavelength of the measured light, $\Delta L$ is the optical path difference of the Michelson interferometer. One cycle of the variation of the optical intensity is so called to as a free spectral range (FSR). If the optical path difference is large, the free spectral range is small.

The second reflector 64 has the reflecting surface that has the step which dimension is $d=\lambda_0/8$. The step causes the optical path difference of $\lambda_0/4$ between first and second half portions of the second one of the divided beams of measured light. As a result, two periodical interference signals, for example, A-phase interference signal and B-phase interference signal differing in phase by $\pi/2$ are obtained The signal processing unit 68 calculates the variation of the wavelength of the measured light and confirms whether the wavelength increases or decreases.

Japans Unexamined Patent Application, First Publication No. 10-339668 discloses still another configuration of the conventional wavelength monitor. FIG. 15 is a block diagram illustrating still another configuration of the conventional wavelength monitor. A lease beam of measured light is emitted from an input optical fiber 70. The emitted measured light is twitted through a lens 71. The lens 71 converts the emitted measured light into a parallel beam of measured light. The parallel beam of measured light is transmitted through a polarizer 72. The polarizer 72 polarizes the parallel beam of measured light. The parallel beam of measured beam is then transmitted to a half minor 73. The half minor 73 divides the parallel beam of measured light into divided beams of measured light. A first one of the divided beams of measured light is received by a photodiode (PD) 74.

A second one of the divided beams of measured light is incident into a birefringent delay plate 75. The birefringent delay plate 75 has a fast axis and a slow axis. A combination of the fast axis and the slow axis causes a delay of $\lambda/8$ that corresponds to a phase shift of $\pi/4$ of polarized light having first and second polarizations. For example, the birefringent delay plate 75 causes a phase shift of the s-polarized light relative to the p-polarized light. The divided beam of phase-shifted light is then transmitted to a polarizing beam splitter 76. The polarizing beam splitter 76 splits the divided beam of phase-shifted measured light into a first beam of p-polarized light and a second beam of s-polarized light. The first beam of p-polarized light is transmitted to and received by a photodiode 77. The second beam of p-polarized light is transmitted to and received by a photodiode 78.

Outputs of the photodiodes 74, 77, and 78 are supplied to a signal processing unit 79. The signal processing unit 79 calculates a wavelength of the measured light. The measured light emitted from the input optical fiber 70 has a variation of optical power over times. An offset due to the optical power variation is corrected by the output from the photodiode 74.

FIG. 16 is a view illustrating relationship between wavelength and intensity of each of the s-polarized light and the p-polarized light to describe the principle of measuring the wavelength by the conventional wavelength monitor shown in FIG. 15. The horizontal axis represents the wavelength. The vertical axis represents the normalized optical power. An offset of the photodiodes 77 and 78 is corrected and normalized, thereby obtaining periodic interference signals differing in phase by 90 degrees from each other, for example, the A-phase interference signal and the B-phase interference signal.

The conventional monitors are so configured that the parallel beam of spatial light is incident into various optical elements such as the cut filter 50, the interference filter 51, the half mirror 62 and 73, the first reflector 63, the second reflector 64, the reflecting prism 65, the polarizer 72, the birefringent delay plate 75, and the polarizing beam splitter 76. This configuration allows a frequent appearance of multiple beam interference. The multiple beam interference superimposes desired multiple interference noise on the output signals from the photodiodes 53, 54, 66, 67, 74, 77, and 78, thereby causing a deterioration of the wavelength-measuring accuracy.

Each of the optical elements is formed of an independent optical part. Using a number of the optical parts makes it difficult to align the optical axis and also increases the manufacturing processes. This makes it difficult to reduce the size of the equipments and increases the cost and reduces the reliability.

SUMMARY OF THE INVENTION

Accordingly, it is an object of the present invention to provide a wavelength monitor that is suitable for measuring stable interference signals with a reduced interference noise.

It is another object of the present invention to provide a wavelength monitor that is adapted to improve a wavelength-measuring accuracy while reducing a multiple interference noise.

It is a further object of the present invention to provide a wavelength monitor that is suitable for realizing scaled-down and cost reduced improvements.

In accordance with a first aspect of the present invention, a wavelength monitor may comprise an optical divider, an interfering element, a light receiving element array, an interference signal converting unit, and a signal processing unit. The optical divider can be configured to divide a beam of measured light into first and second divided beams of measured light. The optical divider can be configured to emit the first and second divided beams of measured light. The interfering element can be configured to convert the first and second divided beams of measured light into first and second parallel beams of measured light. The interfering element can be configured to interfere the first and second parallel beams of measured light with each other to generate an interfered beam of measured light. The light receiving element array may include a plurality of light receiving elements that are configured to receive the interfered beam of measured light. The interference signal converting unit can be configured to receive output signals from the light receiving element array. The interference signal converting unit can be configured to generate interference signals. The interference signals are different in phase by 90 degrees from each other. The signal processing unit can be configured to receive the interference signals from the interference signal converting unit. The signal processing unit can be configured to obtain a wavelength of the measured light from the interference signals.

Preferably, the optical divider may further comprise first and second optical paths that transmit the first and second divided beams of measured light, respectively. The first and second optical paths have first and second light-emitting edges, respectively. The first and second light-emitting edges can be aligned in parallel to each other. The first and second optical paths have first and second optical path lengths, respectively. The first optical path length is defined between the first light-emitting edge and a dividing point at which the beam of measured light is divided into the first and second divided beams of measured light. The second optical path length is defined between the second light emitting edge and the dividing point. The first and second optical path lengths are different from each other.

Preferably, the optical divider may comprise a first planer lightwave circuit substrate.

Preferably, the optical divider may comprise an optical coupler. The optical coupler may comprise a plurality of optical fibers. The wavelength monitor may further comprise a pitch changing element that provides a pitch narrower than a diameter of the plurality of optical fibers. The pitch is defined seen the first and second light emitting edges of the optical coupler. The pitch changing element may comprise a second planer lightwave circuit substrate. The pitch changing element may also comprise fusion-spliced optical fibers. The interfering element may comprise a lens.

Preferably, the interfering element may comprise a concave reflecting mirror. The light receiving element array may comprise at least four light receiving elements. Each of the at least four light receiving elements can be configured to receive a quarter of a spatial period of an interference pattern of the interfered beam of measured light. The at least four light receiving elements can be aligned along a first direction. The interfering element can be configured to uniaxially convert, in the first direction, the first and second divided beams of measured light into first and second parallel beams of measured light.

In accordance with a second aspect of the present invention, the wavelength monitor may comprise an optical divider, a first optical element, a second optical element, a photoelectric converter, and a signal processing unit. The optical divider may include at least first and second light-emitting edges that are aligned in a first direction. The optical divider can be configured to divide a beam of measured light into at least first and second divided beam of measure light. The optical divider allows the first and second divided beams of measured light to be emitted in a second direction from the first and second light-emitting edges, restively. The first optical element can be configured to convert the first and second divided beams of measured light into first and second parallel beams of measured light. The second optical element can be configured to uniaxially condense the first and second parallel beams of measured light in a third direction. The third direction is perpendicular to the first and second directions. The photoelectric converter may include a plurality of light receiving elements. The plurality of light receiving elements can be configured to receive first and second uniaxially condensed beams of measured light from the second optical element. The plurality of light receiving elements can be aligned in the first direction so that each of the plurality of light receiving elements receives an equally-divided one of the period of an interference pattern. The interference pattern is caused by an interference between the first and second uniaxially condensed beams of measured light. Each of the plurality of light receiving elements can be configured to generate an electrical signal that depends on an intensity of the equally-divided one of the period of the interference pattern. Each of the plurality of light receiving elements has a light-receiving surface that is inclined relative to the third direction. The signal processing unit can be configured to receive the electrical signals outputted from the plurality of light-receiving elements. The signal processing unit can be configured to obtain a wavelength of the measured light from the electrical signals.

Preferably, the light-receiving surface can be inclined relative to the third direction by an inclination angle φ that satisfies the following equation:

$$90°>\phi \geq \text{Tan}^{-1}(r/f_2)$$

where r is a radius of the first and second parallel beams of measured light, and $f_2$ is a focal length of the second optical element.

Preferably, the first and second optical elements can be integrated together.

Preferably, the photoelectric converter can be placed so that the light-receiving surface is positioned at a focal position of the first and second uniaxially condensed beams of measured light. The focal position can be defined by a combination of the first and second optical elements.

Preferably, the optical divider may comprise a first planer lightwave circuit substrate.

Preferably, the optical divider may comprise an optical coupler. The optical coupler may comprise a plurality of optical fibers. The wavelength monitor may further comprise a pitch changing element that provides a pitch narrower than a diameter of the plurality of optical fibers. The pitch is defined between the first and second light emitting edges of the optical coupler. The pitch changing element may comprise a second planer lightwave circuit substrate. The pitch changing element may comprise fusion-spliced optical fibers.

In accordance with a third aspect of the present invention, a wavelength monitor may comprise an optical divider, a first optical element, a second optical element, a photoelectric converter, and a signal processing unit. The optical divider may include at least first and second lights-emitting edges that are aligned in a first direction. The optical divider can be configured to divide a beam of measured light into at least first and second divided beams of measured light. The optical divider can be configured to allow the first and second divided beams of measured light to be emitted in a second direction from the first and second light-emitting edges, respectively. The first optical element can be configured to convert the first and second divided beams of measured light into first and second parallel beams of measured light. The second optical element can be configured to uniaxially condense the first and second parallel beams of measured light in a third direction. The third direction is perpendicular to the first and second directions. The photoelectric converter may include a plurality of light receiving elements. The plurality of light receiving elements can be configured to receive first and second uniaxially condensed beams of measured light from the second optical element. The plurality of light receiving elements can be aligned in the first direction so that each of the plurality of light receiving elements receives an equally-divided one of the period of an interference pattern. The interference pattern is caused by an interference between the first and second uniaxially condensed beans of measured light. Each of the plurality of light receiving elements can be configured to generate an electrical signal that depends on an intensity of the equally-divided one of the period of the interference pattern. A signal processing unit can be configured to receive electric signals output from the plurality of light-receiving elements. The signal processing unit can be configured to obtain a wavelength of the measured light.

In accordance with a fourth aspect of the present invention, a wavelength monitor may comprise an optical divider including at least first and second light-emitting edges that are aligned in a first direction. The optical divider can be configured to divide a beam of measured light into at least first and second divided beams of measured light. The optical divider can be configured to allow the first and second divided beams of measured light to be emitted in a second direction from the first and second light-emit edges, respectively. The first optical element can be configured to convert the first and second divided beams of measured light into first and second parallel beams of measured light. The photoelectric converter may include a plurality of light receiving elements. The plurality of light receiving elements can be configured to receive the first and second parallel beams of measured light from the first optical element. The plurality of light receiving elements can be aligned in the first direction so that each of the plurality of light receiving elements receives an equally-divided one of the period of an interference pattern. The interference pattern is caused by an interference between the first and second parallel beams of measured light. Each of the plurality of light receiving elements can be configured to generate an electrical signal that depends on an intensity of the equally-divided one of the period of the interference pattern. Each of the plurality of light receiving elements may have a light-receiving surface that is inclined relative to the third direction. The signal processing unit that receives the electrical signals outputted from the plurality of light-receiving elements. The signal processing unit can be configured to obtain a wavelength of the measured light from the electrical signals.

Preferably, the light-receiving surface can be inclined relative to the third direction by an inclination angle $\phi$ that satisfies the following equation:

$$90° > \phi \geq \mathrm{Tan}^{-1}(r/f_2)$$

where $r$ is a radius of the first and second parallel beams of measured light, and $f_2$ is a focal length of the second optical element.

In accordance with a fifth aspect of the present invention, an optical system may comprise an optical divider including at least first and second light-emitting edges that are aligned in a first direction. The optical divider can be configured to divide a beam of measured light into at least first and second divided beams of measured light. The optical divider can be configured to allow the first and second divided beams of measured light to be emitted in a second direction from the first and second light emitting edges, respectively. The first optical element can be configured to convert the first and second divided beams of measured light into first and second parallel beams of measured light. The second optical element can be configured to uniaxially condense the first and second parallel beams of measured light in a third direction. The third direction is perpendicular to the first and second directions. The photoelectric converter can be configured to receive first and second uniaxially condensed beam of measured light from the second optical element to generate electrical signals that depend on intensities of the first and second uniaxially condensed beams of measured light. The photoelectric converter can have a light-receiving surface that is inclined relative to the third direction.

Preferably, the light-receiving surface can be inclined relative to the third direction by an inclination angle $\phi$ that satisfies the following equation:

$$90° > \phi \geq \mathrm{Tan}^{-1}(r/f_2)$$

where $r$ is a radius of the first and second parallel beams of measured light, and $f_2$ is a focal length of the second optical element.

The photoelectric converter may include a plurality of light receiving elements that are aligned in the first direction so that each of the plurality of light receiving elements receives an equally-divided one of the period of an interference pattern. The interference pattern is caused by an interference between the first and second uniaxially condensed beams of measured light.

In accordance with a sixth aspect of the present invention, an optical system may comprise an optical divider, a first optical element, a second optical element, and a photoelectric converter. The optical divider may include at least first and second light-emitting edges that are aligned in a first direction. The optical divider can be configured to divide a beam of mewed light into at least first and second divided beams of measured light. The optical divider can be configured to allow the first and second divided beams of measured light to be emitted in a second direction from the first and second light-emitting edges, respectively. The first optical element can be configured to convert the first and second divided beams of measured light into first and second parallel beams of measured light. The second optical element can be configured to uniaxially condense the first and second parallel beams of measured light in a third direction, the third direction being perpendicular to the first and second directions. The photoelectric converter can be configured to receive first and second uniaxially condensed beams of measured light from the second optical element to generate electrical signals that depend on intensities of the first and second uniaxially condensed beams of measured light.

Preferably, the photoelectric converter may include a plurality of light receiving elements that are aligned in the first direction so that each of the plurality of light receiving elements receives an equally-divided one of the period of an interference pattern. The interference pattern can be caused by an interference between the first and second uniaxially condensed beams of measured light.

In accordance with a seventh aspect of the present invention, an optical system may comprise an optical divider, a first optical element, and a photoelectric converter. The optical divider may include at least first and second light-emitting edges that are aligned in a first direction. The optical divider can be configured to divide a beam of measured light into at least first and second divided beams of measured light. The optical divider can be configured to allow the first and second divided beams of measured light to be emitted in a second direction from the fix and second light-emitting edges, respectively. The first optical element can be configured to convert the first and second divided beams of measured light into first and second parallel beams of measured light. The photoelectric converter can be configured to receive fast and second parallel beams of measured light from the first optical element to generate electrical signals that depend on intensities of the first and second parallel beams of measured light. The photoelectric converter may have a light-receiving surface that is inclined relative to the third direction.

Preferably, the light-receiving surface can be inclined relative to the third direction by an inclination angle φ that satisfies the following equation:

$$90°>\phi\geq\text{Tan}^{-1}(r/f_2)$$

where r is a radius of the first and second parallel beams of measured light, and $f_2$ is a focal length of the first optical element.

Preferably, the photoelectric converter may include a plurality of light receiving elements that are aligned in the first direction so that each of the plurality of light receiving elements receives an equally-divided one of the period of an interference pattern. The interference pattern is caused by an interference between the first and second parallel beams of measured light.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1A:
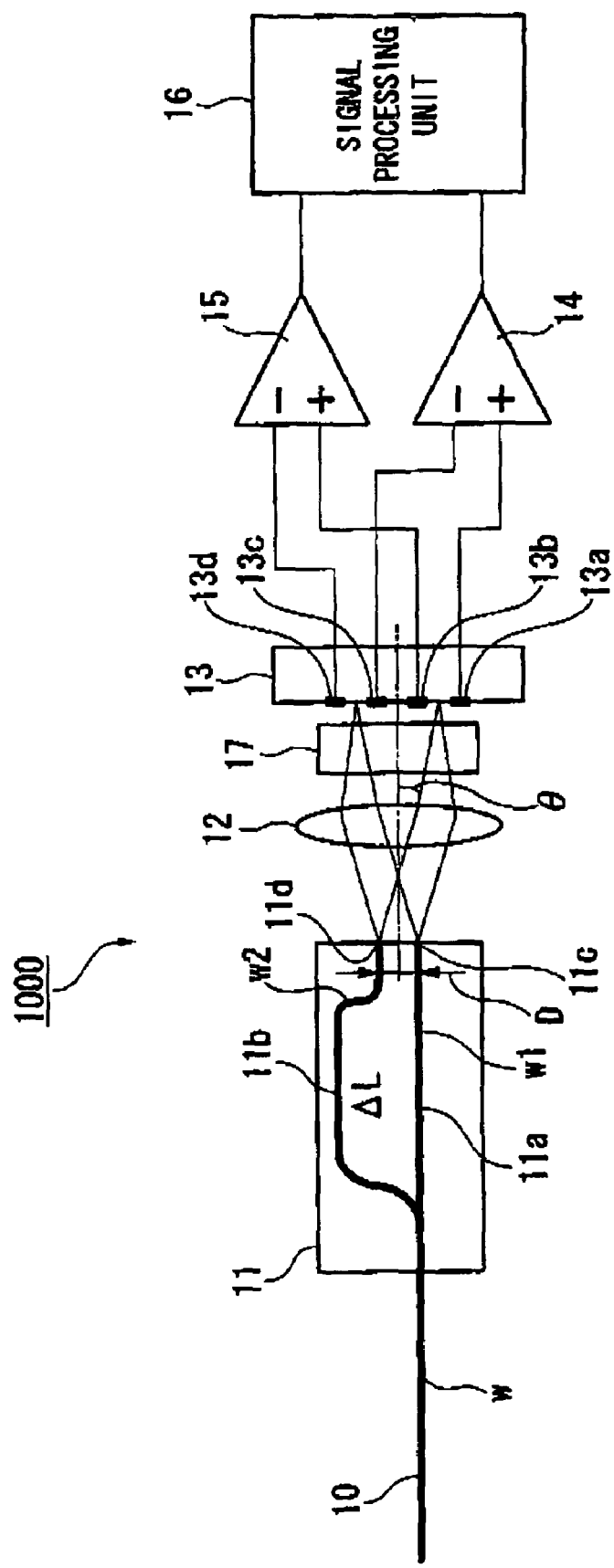
FIG. 1A is a top view illustrating a wavelength monitor in accordance with a first embodiment of the present invention.
Figure 1B:
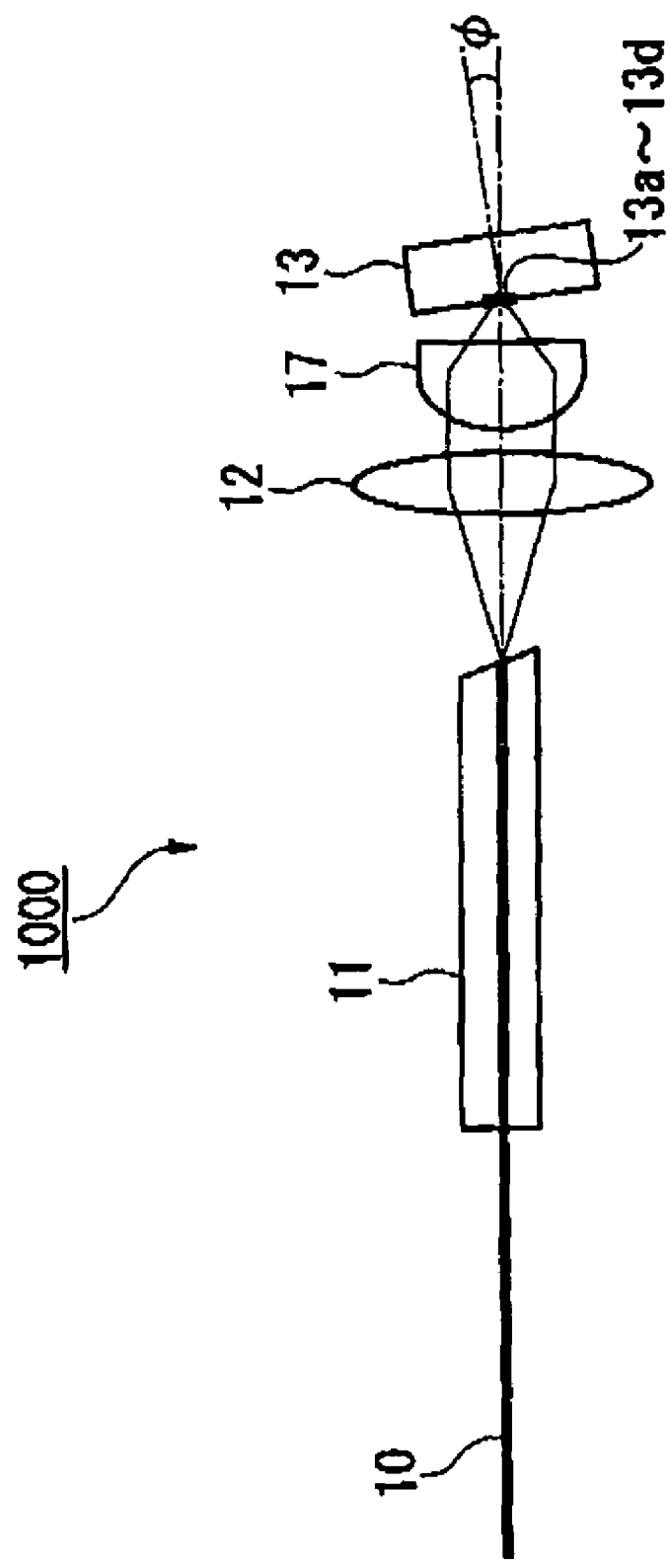
FIG. 1B is a side view illustrating the wavelength monitor shown in FIG. 1A.

A first embodiment of the present invention will be described with reference to the drawings. FIG. 1A is a top view illustrating a wavelength monitor in accordance with a first embodiment of the present invention. FIG. 1B is a side view illustrating the wavelength monitor shown in FIG. 1A. A wavelength monitor 1000 may include, but is not limited to, an input optical fiber 10, a planer lightwave circuit (PLC)

substrate 11, a lens 12, a condenser lens 17, a photodiode array (PDA) 13, a first differential amplifier 14, a second differential amplifier 15, and a signal processing unit 16. Illustrations of the first differential amplifier 14, the second differential amplifier 15, and the signal processing unit 16 are omitted from FIG. 1B, even they are illustrated in FIG. 1A. A combination of the first differed amplifier 14 and the second differential amplifier 15 forms an interference signal unit. The lens 12 and the condenser lens 17 are formed of a first optical system.

A beam of measured light "w" is emitted from a laser light source that is not illustrate. The input optical fiber 10 transmits the beam of measured light "w" to the planer lightwave circuit (PLC) substrate 11 that will hereinafter be referred to as a PLC substrate. The PLC substrate 11 can perform as a waveguide splitter. The PLC substrate 11 has a first optical waveguide 11a and a second optical waveguide 11b. The second optical waveguide 11b is longer in optical path length by $\Delta L$ than the first optical waveguide 11a.

The PLC substrate 11 receives the beam of measured light "w" that has been transmitted from the input optical fiber 10. The PLC substrate 11 splits or divides the beam of measured light "w" into a first divided beam of measured light "w1" and a second divided beam of measured light "w2". The first divided beam of measured light "w1" is transmitted through the first optical waveguide 11a. The second divided beam of measured light "w2" is transmitted through the second optical waveguide 11b. The first and second optical waveguides 11a and 11b have and second emitting edges 11c and 11d, respectively. The first and second emitting edges 11c and 11d are arranged in parallel to each other so that the first and second divided beams of measured light "w1" and "w2" have optical axes that are parallel to each other. The first and second divided beams of measured light "w1" and "w2" emit from the first and second emitting edges 11c and 11d toward the lens 12. As shown in FIG. 1B, the PLC substrate 11 has an emitting-edge side that has a sloped surface including the first and second emitting edges 11c and 11d.

The lens 12 acts as a first lens. The lens 12 can be realized by an optical element such as a collimated lens. The lens 12 is placed on the light-emitting axes of the first and second emitting edges 11c and 11d. The lens 12 receives incidences of the first and second divided beams of measured light "w1" and "w2" emitted from the first and second emitting edges 11c and 11d. The lens 12 converts the first and second divided beams of measured light "w1" and "w2" into first and second parallel beams of measured light. The first and second parallel beams of measured light are then propagated to the condenser lens 17. The condenser lens 17 is placed on a light-emitting axis of the lens 12. The lens 12 has a focal length $f_1$. The lens 12 has a distance $d_1$ from the first and second emitting edges 11c and 11d. The distance $d_1$ is equal to the focal length $f_1$.

The condenser lens 17 acts as a second lens. The condenser lens 17 can be realized by a cylindrical lens. The condenser lens 17 uniaxially condenses the parallel beams of incident light in predetermined uniaxial directions that are antiparallel to each other. The uniaxial directions are parallel to a single axis but are antiparallel to each other. In accordance with this embodiment, as shown in FIG. 1B, the condenser lens 17 is realized by a cylindrical lens that uniaxially condenses the parallel beams of incident measured light in the predetermined uniaxial directions. The predetermined uniaxial directions are perpendicular to the light emitting axes of the first and second divided beams of measured light "w1" and "w2" and also perpendicular to an alignment direction along which the first and second emitting edges 11c and 11d are aligned.

The condenser lens 17 uniaxially condenses the two parallel beams of incident measured light in the predetermined uniaxial directions. The uniaxially condensed beams of measured light are then transmitted from the condenser lens 17 to the photodiode array 13. The uniaxially condensed beam is a beam that is uniaxially condensed in the uniaxial directions but remains parallel in the other directions perpendicular to the uniaxial directions. The uniaxially condensed beam may be referred to as a parallel beam of light because the uniaxially condensed beam has a parallel beam shape in the other directions perpendicular to the above-described uniaxial directions. The photodiode array 13 is placed on a light-emitting axis of the condenser lens 17. The photodiode array 13 is placed at a focal position of an optical system including the condenser lens 17 and the lens 12.

The photodiode array 13 performs as a photoelectric converter. The photodiode array 13 includes an array of first to fourth photodiodes 13a, 13b, 13c, and 13d that perform as light receiving elements. Each of the first to fourth photodiodes 13a, 13b, 13c, and 13d has a light receiving surface 13h that faces toward the condenser lens 17. The first to fourth photodiodes 13a, 13b, 13c, and 13d are aligned in a direction parallel to the alignment direction along which the first and second emitting edges 11c and 11d are aligned. Each of the first to fourth photodiodes 13a, 13b, 13c, and 13d is configured to output an electric signal that depends on the intensity of the received light. The photodiode array 13 has a periodic array of the first to fourth photodiodes 13a, 13b, 13c, and 13d. The dimension of the periodic array corresponds to a period of an optical interference pattern that is caused by the two beam of light emitted from the condenser lens 17. In other words, the first to fourth photodiodes 13a, 13b, 13c, and 13d receive the optical interference pattern so that adjacent two of the first to fourth photodiodes 13a, 13b, 13c, and 13d generate interference signals as electrical output signals, the interference signals differing in phase by 90 degrees from each other.

Figure 2:
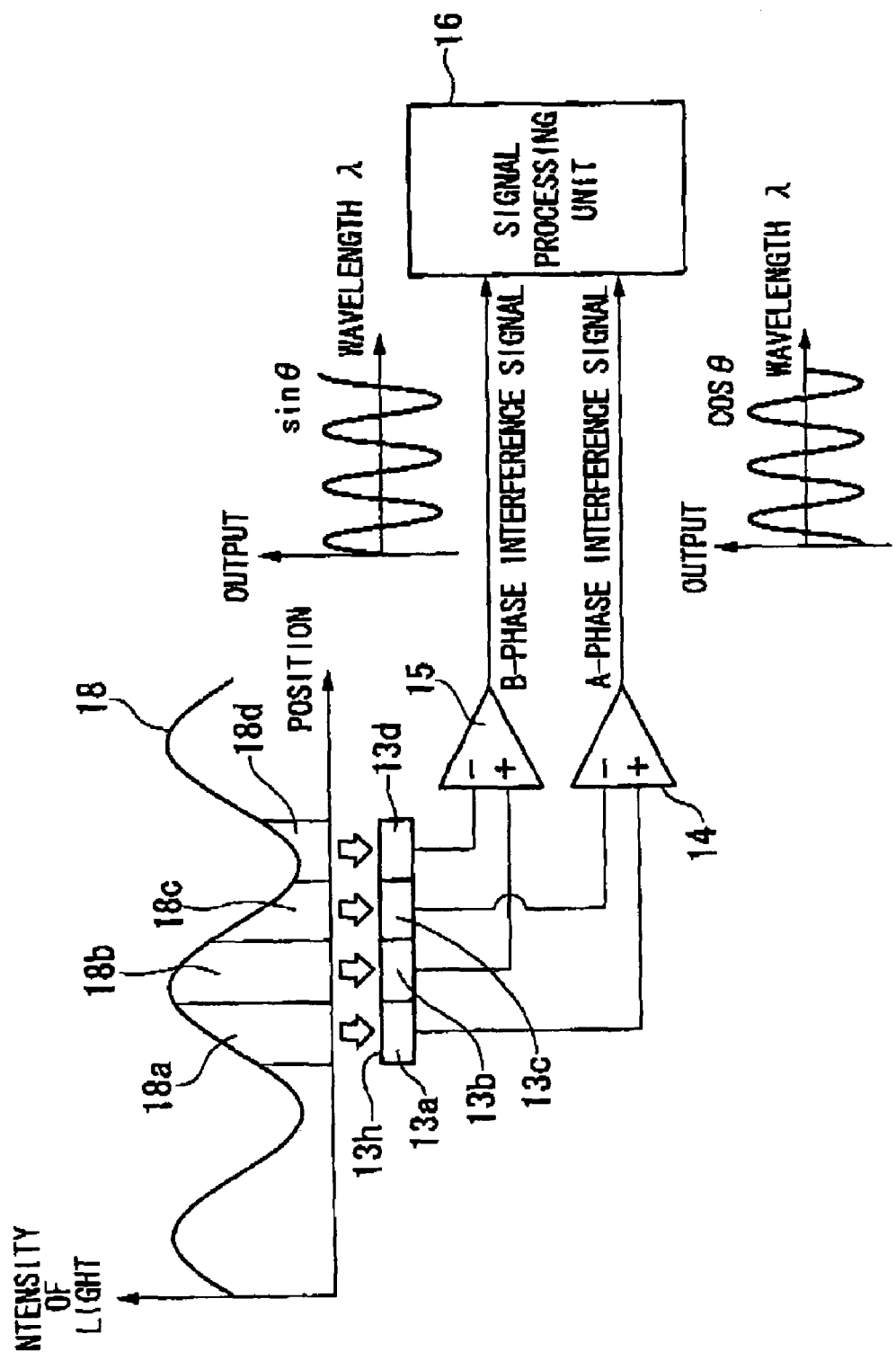
FIG. 2 is a schematic view illustrating a relationship between each position of the first to fourth photodiodes shown in FIG. 1A and a light intensity profile of the interference pattern generated by the two parallel beams of incident light that are transmitted from the condenser lens.

FIG. 2 is a schematic view illustrating a relationship between each position of the first to fourth photodiodes 13a, 13b, 13c, and 13d shown in FIG. 1A and a light intensity profile 18 of the interference pattern generated by the two parallel beams of incident light that are transmitted from the condenser lens 17. The reason why the light intensity profile 18 shown in FIG. 2 is generated by the two parallel beams of incident light will be described later.

In FIG. 2, an area 18a represents an interference pattern area that is received by the first photodiode 13a. An area 18b represents another interference pattern area that is received by the second photodiode 13b. An area 18c represents still another interference pattern area that is received by the third photodiode 13c. An area 18d represents yet another interference pattern area that is received by the fourth photodiode 13d. The light receiving surface 13h of each of the first to fourth photodiodes 13a, 13b, 13c, and 13d has a width which is so adjusted that the light receiving surface 13b receives one quarter period of the interference pattern. One period of the interference pattern can be divided spatially into four quarters that are respectively received by the four light receiving surfaces 13h of the first to fourth photodiodes 13a, 13b, 13c, and 13d.

The period of the interference pattern depends on the wavelength of the measured light. Preferably, the dimension of the whole alignment of the first to fourth photodiodes 13a, 13b, 13c and 13d corresponds to the period of the interference pattern, while the wavelength of a beam of measured light is identical to a enter wavelength of the wavelength-measurable range.

The first to fourth photodiodes 13a, 13b, 13c, and 13d are aligned as described above. The first photodiode 13a generates a first interference signal having a phase of 0 degree. The first photodiode 13a supplies the first interference signal to a positive phase input terminal of the first differential amplifier 14. The second photodiode 13b generates a second interference signal having a phase of 90 degrees. The second photodiode 13b supplies the second interference signal to a positive phase input terminal of the second differential amplifier 15. The third photodiode 13c generates a third interference signal having a phase of 180 degrees. The third photodiode 13c supplies the third interference signal to a negative phase input terminal of the first differential amplifier 14. The fourth photodiode 13d generates a fourth interference signal having a phase of 270 degrees. The fourth photodiode 13d supplies the fourth interference signal to a negative phase input terminal of the second differential amplifier 15.

Figure 3:
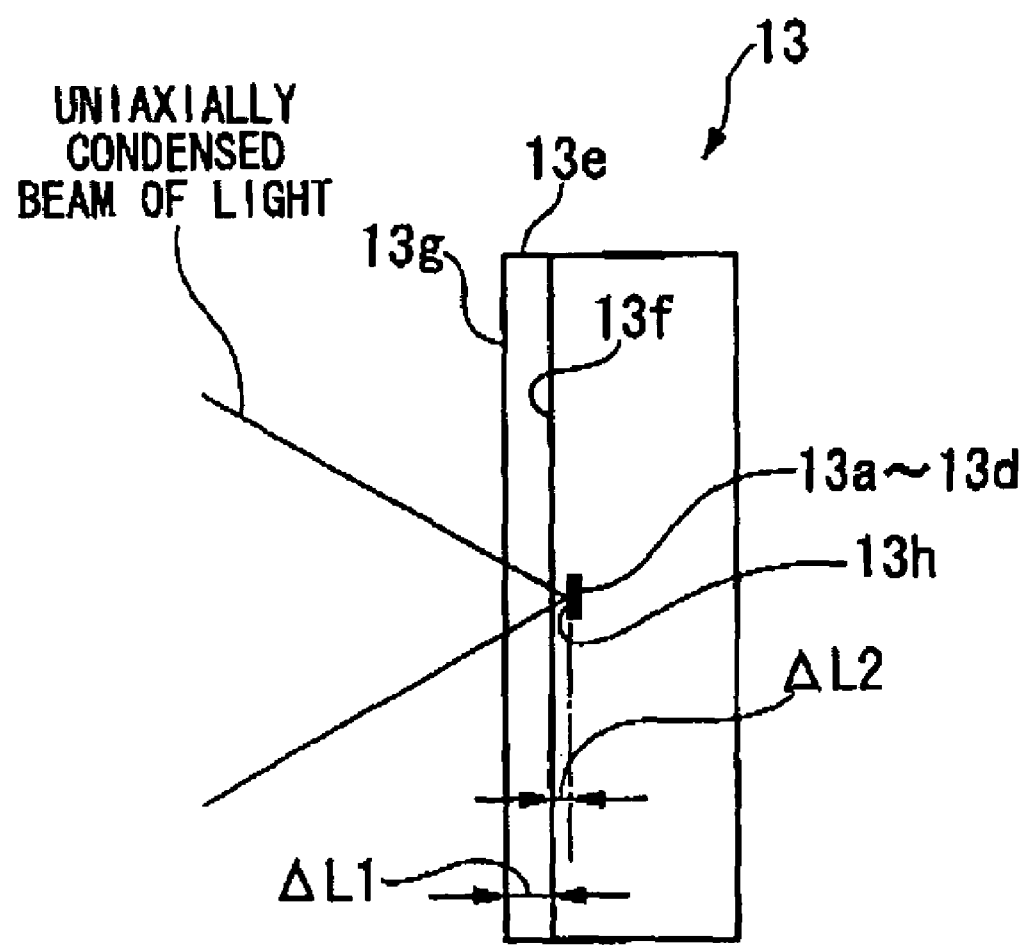
FIG. 3 is a side view illustrating a structure of the photodiode array shown in FIGS. 1A and 2.

FIG. 3 is a side view illustrating a structure of the photodiode array 13 shown in FIGS. 1A and 2. The photodiode array 13 has a first surface that faces toward the condenser lens 17. The first surface is coated with an incident window 13e that has a thickness of $\Delta L1$. The incident window 13e has a first edge face 13f and a second edge face 13g. The first edge face 13f is adjacent to the first surface of the photodiode array 13. The second edge face 13g opposes to the first edge face 13h. The second edge face 13g aces toward the condenser lens 17. The first edge face 13f of the incident window 13e has a distance $\Delta L2$ from the light receiving surfaces 13h of the first to fourth photodiodes 13a, 13b, 13c, and 13d. The second edge face 13g of the incident window 13e has a distance $\Delta L1+\Delta L2$ from the light receiving surfaces 13h of the first to fourth photodiodes 13a, 13b, 13c, and 13d.

As shown in FIG. 2, the light receiving surface 13h of each of the first to fourth photodiodes 13a, 13b, 13c, and 13d of the photodiode array 13 is inclined by an inclination angle .phi. from a predetermined direction. The predetermined direction is perpendicular to the light-emitting axes of the first and second divided beams of measured light "w1" and "w2" and also perpendicular to the alignment direction along which the first and second emitting edges 11c and 11d are aligned.

The first differential amplifier 14 performs a differential amplification of both the first interference signal having the phase of 0 degree and the third interference signal having the phase of 180 degrees. The first differential amplifier 14 generates an A-phase interference signal shown in FIG. 2. The first differential amplifier 14 supplies the A-phase interference signal to the signal processing unit 16. The second differential amplifier 15 performs another differential amplification of both the second interference signal having the phase of 90 degrees and the fourth interference signal having the phase of 270 degrees. The second differential amplifier 15 generates a B-phase interference signal shown in FIG. 2. The second differential amplifier 15 supplies the B-phase interference signal to the signal processing unit 16. The A-phase interference signal and the B-phase interference signal differ in phase by 90 degrees from each other. The signal processing unit 16 performs one or more predetermined signal processes based on the A-phase interference signal and the B-phase interference signal so as to calculate a variation in wavelength of the beam of measured light "w".

Operations of the wavelength monitor 1000 will be described.

The beam of measured light "w" is transmitted through the input optical fiber 10 to the PLC substrate 11. The beam of measured light "w" is divided by the PLC substrate 11 into the first and second divided beams of measured light "w1" and "w2". The first and second divided beam of measured light "w1" and "w2" are then respectively transmitted through the first and second optical waveguides 11a and 11b differing in optical path length by $\Delta L$. The first divided beam of measured light "w1" is emitted from the first emitting edge 11e and then propagated to the lens 12. The second divided beam of measured light "w2" is emitted from the second emitting edge 11d and then propagated to the lens 12.

The lens 12 converts the first and second divided beans of measured light "w1" and "w2" into two parallel beams of measured light. The two parallel beams of measured light are then propagated to the condenser lens 17 that is placed on the light-emitting axis of the lens 12. As shown in FIG. 1A, a distance "D" between the first emitting edge 11c and the second emitting edge 11d is set approximately several tens micrometers. The emitting direction of each of the two parallel beams of measured light is inclined by an inclination angle $\theta$ from the light emitting axis of the lens 12. The inclination angle $\theta$ is given by the following equation (2).

$$\theta=\tan^{-1}(D/2f_1) \quad (2)$$

The emission directions of the two parallel beams of measured light differ from each other by two times the inclination angle $\theta$. A pair of the two parallel beams of measured light has a spatial interference pattern. The paired parallel beams of measured light are propagated to the photodiode array 13. The period in wavelength of this interference pattern, namely a free spectral range (FSR), is given by the following equation (3).

$$FSR=\lambda^2/\Delta L \quad (3)$$

where $\lambda$ is the wavelength of the beam of measured light "w".

The two parallel beams of measured light are propagated from the lens 12 to the condenser lens 17, The two parallel beams of measured light are uniaxially condensed in the above-described predetermined uniaxial directions by the condenser lens 17. The uniaxially condensed beams of measured light are then propagated to the photodiode array 13. Namely, in the condenser lens 17, the two parallel beams of measured light are condensed in the predetermined uniaxial directions only but are not condensed in the horizontal directions that are perpendicular to the uniaxial directions. As described above, the uniaxially condensed beam is a beam that is uniaxially condensed in the uniaxial directions but remains parallel in the other directions perpendicular to the uniaxial directions. The uniaxially condensed beam may be referred to as a parallel beam of light because the uniaxially condensed beam has a parallel beam shape in the other directions perpendicular to the above-described uniaxial directions. A pair of the uniaxially condensed beams of measured light is propagated to the photodiode array 13, while the pair of the uniaxially condensed beams of measured light has a spatial interference pattern.

Figure 4A:
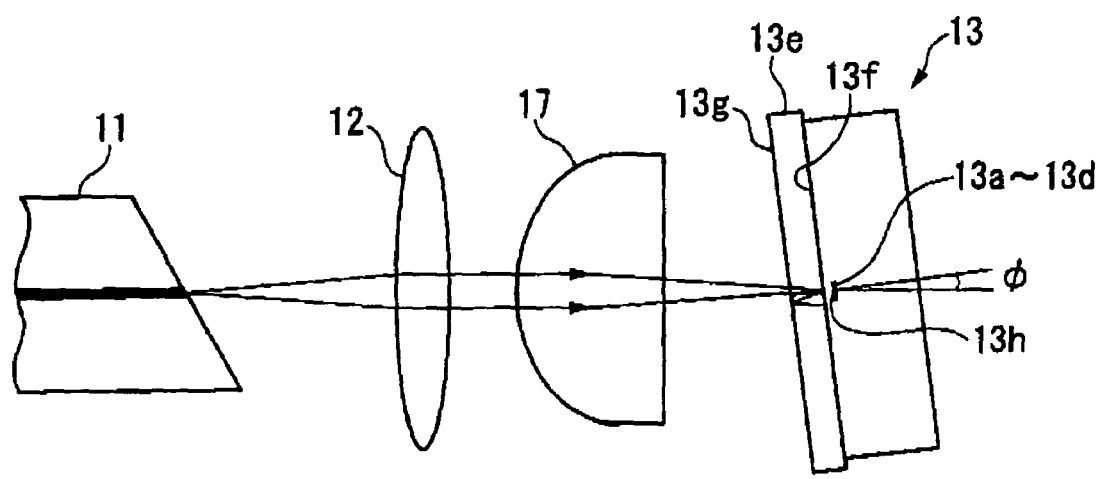
FIG. 4A is a schematic side view illustrating propagation of the parallel beams of measured light from a PLC substrate through a lens and a condenser lens to a photodiode array.
Figure 4B:
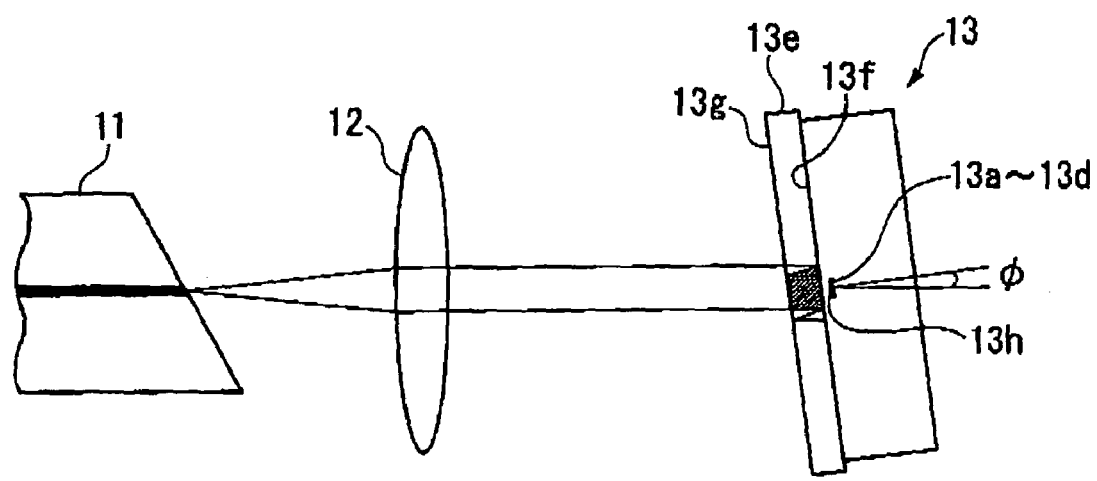
FIG. 4B is a schematic side view illustrating propagation of the parallel beams of measured light from a PLC substrate through the lens to the photodiode array.

FIG. 4A is a schematic side view illustrating propagation of the parallel beams of measured light from the PLC substrate 11 through the lens 12 and the condenser lens 17 to the photodiode array 13. The photodiode array 13 is so placed as to be inclined by the inclination angle $\phi$ in the above-described predetermined direction as described above. FIG. 4B is a schematic side view illustrating propagation of the parallel beams of measured light from the PLC substrate 11 through the lens 12 to the photodiode array 13. FIG. 4B illustrates the propagation of the parallel beams of measured light to the photodiode array 12 without condensing the parallel beams of measured light in the predetermined direction due to no provision of the condenser lens 17.

The beams of measured light are incident into the incident window 13e of the photodiode array 13. The beams of measured light are then reflected between reflecting mirrors, namely between the second edge face 13g and the first edge face 13f, between the first edge face 13f and the light receiving surface 13h, and between the second edge face 13g and the light receiving surface 13h. The reflected beams of measured light are then incident into the light receiving surface 13h.

In other words, first to third cavities are established between the second edge face 13g and the light receiving surface 13h. The first cavity is defined between the second edge face 13g and the first edge face 13f. The first cavity has a first optical path length ΔL1 that is defined by a distance between the second edge face 3g and the first edge face 13f. The second cavity is defined between the first edge face 13f and the light receiving surface 13h. The second cavity has a second optical path length ΔL2 that is defined by a distance between the first edge face 13f and the light receiving surface 13h. The third cavity is defined between the second edge face 13g and the light receiving surface 13h. The third cavity has a third optical path length ΔL3 that is defined by a distance between the second edge face 13g and the light receiving surface 13h. The third optical path length ΔL3 is equal to a sum of the first optical path length ΔL1 and the second optical path length ΔL2. Namely, a relationship ΔL3=ΔL1+ΔL2. Those first to third cavities cause multiple interferences between the parallel beams of measured light. The last described multiple interference noise is superimposed on the interference signals that are outputted from the first to fourth photodiodes 13a, 13b, 13c, and 13d, thereby deteriorating the wavelength-measuring accuracy.

In a case shown in FIG. 4B, the parallel bets of measured light are incident into the incident window 13e of the photodiode array 13. The parallel beams of incident light are then reflected repeatedly between the second edge face 13g and the first edge face 13f. The reflected beams of light are then incident into the light receiving surfaces 13h of the first to fourth photodiodes 13a, 13b, 13c, and 13d. Namely, the multiple interferences are caused in a limited region that is hatched and positioned between the second edge face 13g and the first edge face 13f. Even illusion is omitted, the multiple interferences are also caused between the first edge face 13f and the light receiving surface 13h and between the second edge face 13g and the light receiving surface 13h.

As shown in FIG. 4A, the condenser lean 17 is interposed between the lens 12 and the photodiode array 13. The condenser lens 17 uniaxially condenses the parallel beams of measured light in the above-described uniaxial directions only. The uniaxially condensed beams of measured light are then incident into the incident window 13e. This largely reduces the multiple interferences.

Preferably, the inclination angle φ of the photodiode array 13 is set to satisfy the following equation (4).

$$90\ \text{degre} > \phi \geq \text{Tan}^{-1}(r/f_2) \quad (4)$$

where r is the radius of each of the beams of light, $f_2$ is the focal length of the condenser lens 17. The inclination angle φ of the photodiode array 13 that satisfying the above equation (4) allows a reduction of the multiple interferences. Needless to say, the inclination angle φ of the photodiode array 13 should be set so that the first to fourth photodiodes 13a, 13b, 13c, and 13d generate the first to fourth interference signals as outputs.

The two uniaxially condensed beams of measured light have a desired spatial interference pattern with reduced multiple interferences. The two uniaxially condensed beams of measured light are incident into the light receiving surfaces 13h of the first to fourth photodiodes 13a, 13b, 13c, and 13d.

The first photodiode 13a generates the first interference signal having the phase of 0 degree. The first photodiode 13a supplies the first interference signal to a positive phase input terminal of the first differential amplifier 14. The second photodiode 13b generates the second interference signal having the phase of 90 degrees. The second photodiode 13b supplies the second interference signal to the positive phase input terminal of the second differential amplifier 15. The third photodiode 13c generates the third interference signal having the phase of 180 degrees. The third photodiode 13c supplies the third interference signal to the negative phase input terminal of the first differential amplifier 14. The fourth photodiode 13d generates the fourth interference signal having the phase of 270 degrees. The fourth photodiode 13d supplies the fourth interference signal to a negative phase input terminal of the second differential amplifier 15.

The first differential amplifier 14 performs a first differential amplification of both the first interference signal having the phase of 0 degree and the third interference signal having the phase of 180 degrees. The first differential amplifier 14 generates an A-phase interference signal. The first differential amplifier 14 supplies the A-phase interference signal to the signal processing unit 16. The second differential amplifier 15 performs a second differential amplification of both the second interference signal having the phase of 90 degrees and the fourth interference signal having the phase of 270 degrees. The second differential amplifier 15 generates a B-phase interference signal. The second differential amplifier 15 supplies the B-phase interference signal to the signal processing unit 16. The A-phase interference signal and the B-phase interference signal have the period or the free spectral range that is given by the above-described equation (3). The signal processing unit 16 applies a predetermined calculating process to the A-phase interference signal and the B-phase interference signal in order to find a phase. The signal processing unit 16 calculates the wavelength λ of the beam of measured light with reference to the phase.

In accordance with the first embodiment, the wavelength monitor 1000 is configured so that the uniaxially condensed beams of measured light are incident into the photodiode array. A possible reduction can be obtained of the number of necessary optical elements for the wavelength monitor, thereby reducing the multiple interferences that are caused by residual reflection coefficient of the surface of an optical element. Particularly, a large reduction can be obtained of the multiple interferences of the uniaxially condensed beams of measured light. This reduction can prevent the multiple interference noise from being superimposed on the interference signals that are outputted from the first to fourth photodiodes 13a, 13b, 13c, and 13d. This prevention improves the wavelength measuring accuracy.

The condenser lens 17 uniaxially condenses the parallel beams of measured light so that the uniaxially condensed beams of measured light are incident into the photodiode array 13. The uniaxially condensed beams of measured light are higher in intensity than the omnidirectionally parallel beams of measured light. The increased intensity of measured light incident into the photodiode array allows the first to fourth photodiodes 13a, 13b, 13c, and 13d to generate large output signals, namely the first to fourth interference signals that are stable to noise. This improves the wavelength measuring accuracy.

The PLC substrate 11 has the light-emitting edge face that is inclined relative to the light-emitting axis. The inclination of the light-emitting edge face reduces the multiple interferences that are caused by the first and second emitting edges 11c and 11d. It is also possible a modification for the emitting edge of the PLC substrate 11, the lens 11, the condenser lens 17 and the photodiode array 13 to have an antireflection coating to reduce the multiple interference.

The wavelength monitor 1000 needs a reduced number of the optical elements as compared to the conventional wavelength monitor. This reduction of the number of the optical element reduces the number of the process for optical axis alignment. This results in a reduction in size of the wavelength monitor and another reduction of the manufacturing cost.

In accordance with the first embodiment, the photodiode array 13 has an emitting-edge face that is inclined by an inclination angle φ from the predetermined direction that is perpendicular to the light emitting axes of the first and second divided beams of measured light "w1" and "w2" and is further perpendicular to the alignment direction along which the first and second light emitting edges 11c and 11d are aligned. The two parallel beams of measured light are uniaxially condensed in the uniaxial directions that are antiparallel to each other and also parallel to the predetermined direction from which the emitting-edge face that is inclined by the inclination angle φ. The uniaxially condensed parallel beams of measured light are incident into the inclined emitting-edge face of the photodiode 13. Notwithstanding, the following modifications can alternatively be available.

In accordance with the first modification, the condenser lens 17 can not be used so that the parallel beams of measured light are incident into the emitting edge face that is inclined by the inclination angle φ from the predetermined direction. The parallel beams of measured light are omnidirectionally parallel beams of light that are not condensed in the uniaxial directions.

In accordance with the second modification, the condenser lens 17 is used to uniaxially condense the parallel beams of measured light in the uniaxial directions. The uniaxially condensed beams of measured light are then incident into the light receiving face that is not inclined. In other words, the light receiving face is inclined by zero inclination angle φ=0 from the predetermined direction parallel to the uniaxial directions.

The last-described first and second modifications provide the effects of reducing the multiple interferences. The effects are lower than that of the above-described first embodiment but are higher than that of the conventional one.

Second Embodiment

Figure 5:
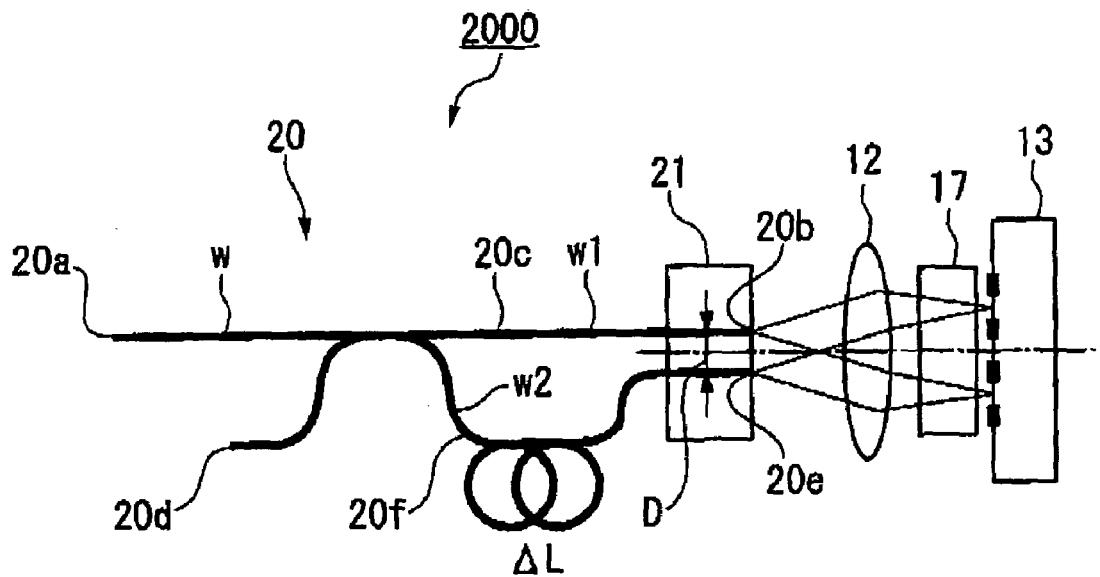
FIG. 5 is a top view illustrating a wavelength monitor in accordance with a second embodiment of the present invention.

A second embodiment of the present invention will be described with reference to FIG. 5. FIG. 5 is a top view illustrating a wavelength monitor 2000 in accordance with the second embodiment of the present invention. In FIG. 5, the same elements as shown in FIG. 1 are allocated with the same reference numbers. Duplicate descriptions of the same elements are omitted. As shown in FIG. 5, the wavelength monitor 2000 of the second embodiment is different in configuration from the wavelength monitor 1000 of the first embodiment. An optical couplet 20 and a V-grooved substrate 21 are newly provided instead of the PLC substrate 11. The optical coupler 20 has two inputs and two outputs. The optical coupler 20 is formed by using optical fibers. The wavelength monitor 2000 also includes the first and second differential amplifiers 14 and 15 and the signal processing unit 16 that are shown in FIG. 1, even illustrations of those elements are omitted in FIG. 5.

The optical coupler 20 can be realized by an optical waveguide splitter. The optical coupler 20 includes a first optical path 20c and a second optical path 20f. The first optical path 20c has a first light-incident edge 20a and a first light-emitting edge 20b. The second optical path 20f has a second light-incident edge 20d and a second light-emitting edge 20e. The second optical path 20f is longer in path length by ΔL than the first optical path 20c. The first light-incident edge 20a is connected to the input optical fiber 10 shown in FIG. 1A. The second light incident edge 20d is antireflection-coated.

A beam of measured light "w" is transmitted through the input optical fiber 10. The beam of measured light "w" is then incident into the first light-incident edge 20a of the optical coupler 20. The beam of measured light "w" is divided into a first divided beam of measured light "w1" and a second divided beam of measured light "w2". The first and second divided beams of measured light "w1" and "w2" are propagated through the first and second optical paths 20c and 20f, respectively. The first and second divided beams of measured light "w1" and "w2" are respectively emitted from the first and second light-emitting edges 20b and 20e. The first and second light-emitting edges 20b and 20e are placed in parallel to each other so that optical axes of the first and second divided beams of measured light "w1" and "w2" are parallel to each other. The first and second divided beams of measured light "w1" mad "w2" as emitted are then propagated to the lens 12. The first and second light-emitting edges 20b and 20e are mechanically fixed by the V-grooved substrate 21.

The V-grooved substrate 21 has two V-shaped grooves. The two V-shaped grooves extend in parallel to optical axes of the first and second divided beams of measured light emitted from the optical coupler 20, The first light-emitting edge 20b and the second light-emitting edge 20e of the optical coupler 20 are mechanically fixed by the two V-shaped grooves, respectively.

Operations of the wavelength monitor 2000 will be described. A beam of measured light "w" is transmitted through the input optical fiber 10 shown in FIG. 1. The beam of measured light "w" is then incident into the optical coupler 20. In the optical coupler 20, the beam of measured light "w" is divided into the first and second divided beams of measured light "w1" and "w2". The first and second divided beams of measured light "w1" and "w2" are respectively transmitted through the first and second optical paths 20c and 20f that differ from each other in optical path length by ΔL. The first divided beam of measured light "w1" is emitted from the first light-emitting edge 20b. The second divided beam of measured light "w2" is emitted from the second light-emitting edge 20e. The first and second divided beams of measured light "w1" and "w2" as emitted are then transmitted to the lens 12. The first and second light-emitting edges 20b and 20e are placed in parallel to each other and are distanced by a distance D from each other.

The first and second divided beams of measured light "w1" and "w2" are transmitted to the lens 12. The lens 12 is placed on the optical axes of the optical coupler 20 that is hold by the V-grooved substrate 21. The first and second divided beams of measured light "w1" and "w2" are converted into two parallel beams of measured light by the lens 12. The two parallel beams of measured light are then propagated to the condenser lens 17.

The operations or functions of the condenser lens 17 and the photodiode array 13 that are shown in FIG. 5 are the same as those in the first embodiment. The operations or functions of the first and second differential amplifiers 14 and 15 and the signal processing unit 16 that are shown in FIG. 1 but are not shown in FIG. 5 are also the same as those of in the first embodiment. Duplicate descriptions of the operations and functions of those optical elements will be emitted.

In accordance with the second embodiment, the wavelength monitor 2000 includes the optical coupler 20 using the optical fiber that performs as the beam splitter or optical divider. Using the optical coupler 20 is more suitable for increasing the difference ΔL of the optical path lengths of the first and second optical paths 20c and 20f as compared to using the PLC substrate 11. The increased difference ΔL of the optical path lengths improves wavelength resolution of the wavelength monitor.

In accordance with the second embodiment, the photodiode array 13 has an emitting-edge face that is inclined by an inclination angle φ from the predetermined direction that is perpendicular to the light emitting axes of the first and second divided beams of measured light "w1" and "w2" and is further perpendicular to the alignment direction along which the first and second light emitting edges 20b and 20e of the optical coupler 20 are aligned. The two parallel beams of measured light are uniaxially condensed in the uniaxial directions that are antiparallel to each other and also parallel to the predetermined direction from which the emitting-edge face that is inclined by the inclination angle φ. The uniaxially condensed parallel beams of measured light are incident into the inclined emitting-edge face of the photodiode 13. Notwithstanding, the following modifications can alternatively be available.

In accordance with the first modification, the condenser lens 17 can not be used so that the parallel beams of measured light are incident into the emitting edge face that is inclined by the inclination angle φ from the predetermined direction. The parallel beams of measured light are omnidirectionally parallel beams of light that are not condensed in the uniaxial directions.

In accordance with the second modification, the condenser lens 17 is used to uniaxially condense the parallel beams of mea light in the uniaxial directions. The uniaxially condensed beams of measured light are then incident into the light receiving face that is not inclined. In other words, the light receiving face is inclined by zero inclination angle φ=0 from the predetermined direction parallel to the uniaxial directions.

The last-described first and second modifications provide the effects of reducing the multiple interferences. The effects are lower than that of the above-described second embodiment but are higher than that of the conventional one.

Third Embodiment

Figure 6:
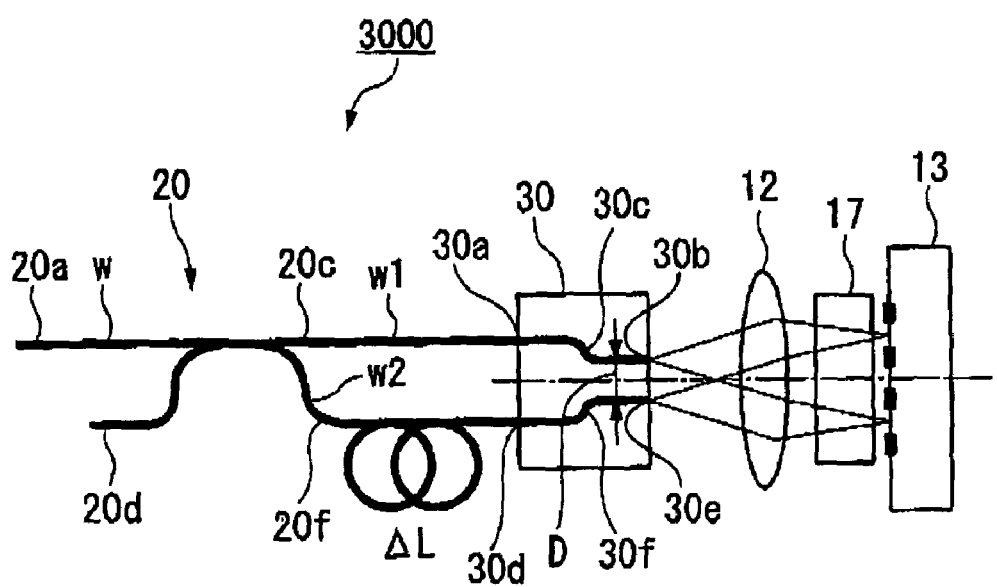
FIG. 6 is a top view illustrating a wavelength monitor in accordance with a third embodiment of the present invention.

A third embodiment of the present invention will be described with reference to FIG. 6. FIG. 6 is a top view illustrating a wavelength monitor 3000 in accordance with the third embodiment of the present invention. In FIG. 6, the same elements as shown in FIG. 5 are allocated with the same reference numbers. Duplicate descriptions of the same elements are omitted. As shown in FIG. 6, the wavelength monitor 3000 of the third embodiment is different in configuration from the wavelength monitor 2000 of the second embodiment. A pitch changing element 30 is newly provided instead of the V-grooved substrate 21. The wavelength monitor 3000 also includes the first and second differential amplifiers 14 and 15 and the signal processing unit 16 that are shown in FIG. 1, even illustrations of those elements are omitted in FIG. 6.

The pitch changing element 30 can be realized by a PLC substrate that includes a first optical path 30c and a second optical path 30f. The first optical path 30c has a first light-incident edge 30a and a first light-emitting edge 30b. The second optical path 30f has a second light-incident edge 30d and a second light-emitting edge 30e. The second optical path 30f is equal in path length to the first optical path 30c. The first light incident edge 30a is connected to the first light-emitting edge 20b of the optical coupler 20. The second tight-incident edge 30d is connected to the second light emitting edge 20e of the optical coupler 20.

The first divided beam of measured light "w1" is transmitted through the optical coupler 20 and is then incident into the first light-incident edge 30a of the pitch changing element 30. The first divided beam of measured light "w1" is emitted from the first light-emitting edge 30b. The first divided beam of measured light "w1" as emitted is propagated to the lens 12. The second divided beam of measured light "w2" is transmitted through the optical coupler 20 and is then incident into the second light-incident edge 30d of the pitch changing element 30. The second divided beam of measured light "w2" is emitted from the second light-emitting edge 30e. The second divided beam of measured light "w2" as emitted is propagated to the lens 12. The first and second light-emitting edges 30b and 30e are placed in parallel to the optical emitting axes of the first and second divided beams of mired light "w1" and "w2" as emitted from the optical coupler 20.

A distance D between the first and second light-emitting edges 30b and 30e of the pitch changing element 30 shown in FIG. 6 is narrower than the distance between the first and second light-emitting edges 20b and 20e of the V-grooved substrate 21 shown in FIG. 5. The distance D between the first and second light-emitting edges 30b and 30e can, for example, be narrower than a diameter of the optical fiber that constitutes the optical coupler 20.

Operations of the wavelength monitor 3000 will be described. A beam of measured light "w" is incident into the optical coupler 20. In the optical coupler 20, the beam of measured light "w" is divided into the first and second divided beam of measured light "w1" and "w2". The first divided beam of measured light "w1" is then incident into the first light-incident edge 30a of the pitch changing element 30. The first divided beam of measured light "w1" is further transmitted through the first optical path 30c of the pitch changing element 30. The first divided beam of measured light "w1" is then emitted from the first light-emitting edge 30b of the pitch changing element 30. The second divided beam of mea light "w2" is then incident into the second light-incident edge 30d of the pitch changing element 30. The second divided beam of measured light "w2" is further transmitted through the second optical path 30f of the pitch changing element 30. The second divided beam of measured light "w2" is then emitted from the second light-emitting edge 30e of the pitch changing element 30. The first and second divided beans of measured light "w1" and "w2" are transmitted to the lens 12.

The lens 12 is placed on the optical axes of the pitch changing element 30. The first and second divided beams of measured light "w1" and "w2" are converted into two parallel beams of measured light by the lens 12. The two parallel beams of measured light are then propagated to the condenser lens 17.

The operations or functions of the condenser lens 17 and the photodiode array 13 that shown in FIG. 6 are the same as those in the first embodiment. The operations or functions of the first and second differential amplifiers 14 and 15 and the signal processing unit 16 that are shown in FIG. 1 but are not shown in FIG. 6 are also the same as those of in the first embodiment. Duplicate descriptions of the operations and functions of those optical elements will be emitted.

In accordance with the third embodiment, the wavelength monitor 3000 includes the pitch changing element 30 that provides an adjusted distance between the light-emitting edges from which the first and second divided beams of measured light are emitted, respectively. The adjusted distance is narrower than the distance between the first and second light-emitting edges 20b and 20e of the optical coupler 20. The optical coupler 20 has the distance between the first and second light-emitting edges, wherein it is physically difficult that the distance is smaller than the diameter of the optical fiber of the optical coupler 20. Using the pitch changing element 30 allows that the distance between the first and second light-emitting edges is narrower than the diameter of the optical fiber of the optical coupler 20. Narrowing the distance between the first and second light-emitting edges allows shortening the focal distance of the leas 12, thereby reducing the dimension of the wavelength monitor 3000. Shortening the focal distance of the lens 12 allows increasing the intensity of each of the uniaxially condense beads of measured light incident into the photodiode array 13. It is also possible as a modification for the pitch changing element 30 to be realized by fusion-spliced optical fibers.

In accordance with the third embodiment, the photodiode army 13 has an emitting-edge face that is inclined by an inclination angle φ from the predetermined direction that is perpendicular to tee light emitting axes of the first and second divided beams of measured light "w1" and "w2" and is further perpendicular to the alignment direction along which the first and second light emitting edges 30b and 30e of the pitch changing element 30 are aligned. The two parallel beams of measured light are uniaxially condensed in the uniaxial directions that are antiparallel to each other and also parallel to the predetermined direction from which the emitting-edge face that is inclined by the inclination angle φ. The uniaxially condensed parallel beams of measured light are incident into the inclined emitting-edge face of the photodiode 13. Notwithstanding, the following modifications can alternatively be available.

In accordance with the first modification, the condenser lens 17 can not be used so that the parallel beams of measured light are incident into the emitting edge face that is inclined by the inclination angle φ from the predetermined direction. The parallel beams of measured light are omnidirectionally parallel beams of light that are not condensed in the uniaxial directions.

In accordance with the second modification, the condenser lens 17 is used to uniaxially condense the parallel beams of measured light in the uniaxial directions. The uniaxially condensed beams of measured light are then incident into the light receiving face that is not inclined. In other words, the light receiving face is inclined by zero inclination angle φ=0 from the predetermined direction parallel to the uniaxial directions.

The last-described first and second modifications provide the effects of reducing the multiple interferences. The effects are lower than that of the above-described third embodiment but are higher than that of the conventional one.

Fourth Embodiment

Figure 7A:
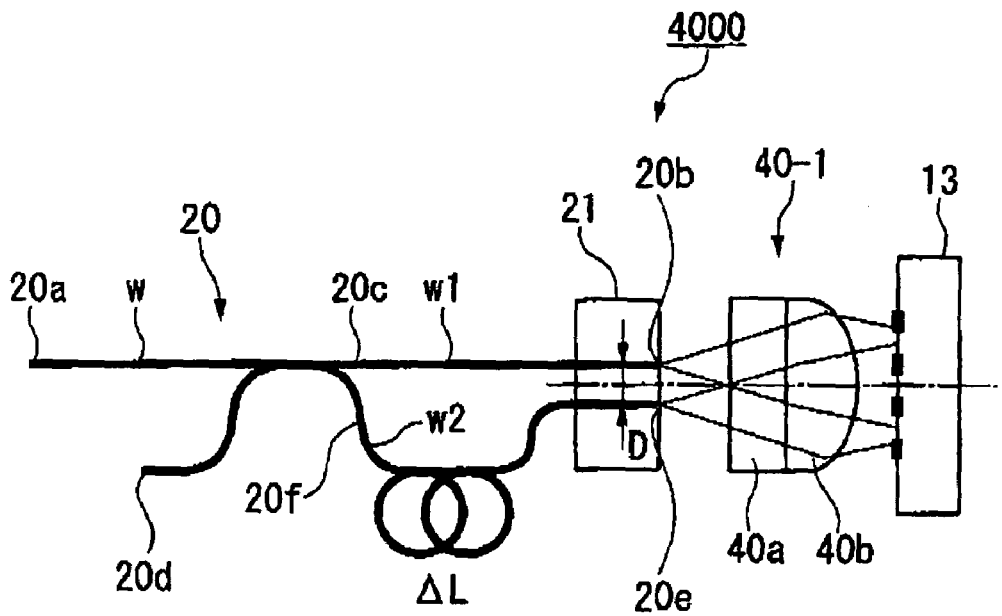
FIG. 7A is a top view illustrating a wavelength monitor in accordance with a fourth embodiment of the present invention.
Figure 7B:
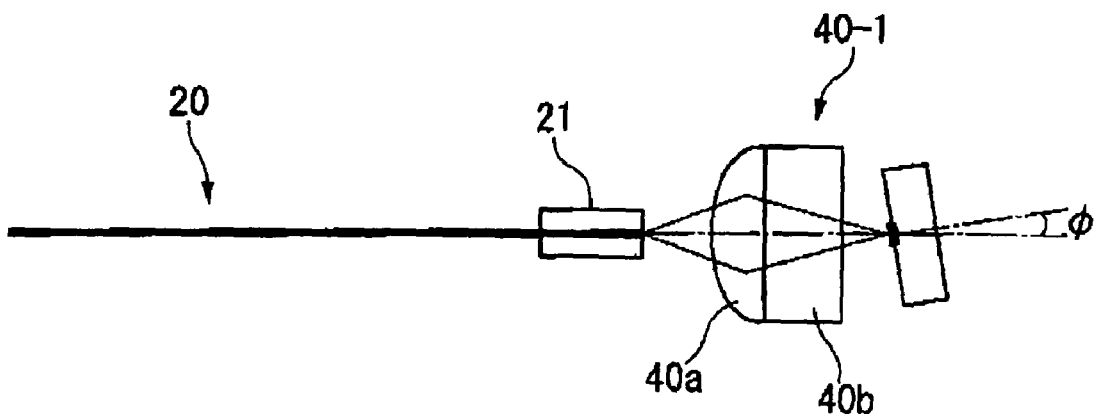
FIG. 7B is a side view illustrating the wavelength monitor shown in FIG. 7A.

A fourth embodiment of the present invention will be described with reference to FIGS. 7A and 7B. FIG. 7A is a top view illustrating a wavelength monitor 4000 in accordance with the fourth embodiment of the present invention. FIG. 7B is a side view illustrating the wavelength monitor 4000 shown in FIG. 7A. In FIGS. 7A and 7B, the same elements as shown in FIG. 5 are allocated with the same reference numbers. Duplicate descriptions of the same elements are omitted. As shown in FIGS. 7A and 7B, the wavelength monitor 4000 of the fourth embodiment is different in configuration from the wavelength monitor 2000 of the second embodiment. An integrated lens 40-1 is newly provided instead of the lens 12 and the condenser lens 17. The wavelength monitor 4000 also includes the first and second differential amplifiers 14 and 15 and the signal processing unit 16 that are shown in FIG. 1, even illusions of those elements are omitted in FIGS. 7A and 7B.

The integrated lens 40-1 is configured by an integration of a first lens 40a and a second lens 40b. The first lens 40a can be realized by a cylindrical lens. The second lens 40b can be realized by another cylindrical lens. The first divided beam of measured light "w1" is emitted from the first light-emitting edge 20b of the optical coupler 20. Tee second divided beam of measured light "w2" is emitted from the second light-emitting edge 20e of the optical coupler 20. The first and second divided beams of measured light "w1" and "w2" have an omnidirectional spread. The first lens 40a uniaxially condenses the first and second omnidirectionally-spread divided beams of measured light "w1" and "w2" in the above-described uniaxial directions only. The uniaxially condensed beams of mea light still have an uniaxial spread. The uniaxially-condensed uniaxially-spreading beams of measured light are propagated to the second lens 40b. The second lens 40b uniaxially converts the uniaxially-condensed uniaxially-spreading beams of measured light into the uniaxially condensed beams of measured light having no spreading in the other directions perpendicular to the predetermined unidirectional direction. The uniaxially condensed beams of measured light are propagated to the photodiode array 13.

Operations of the wavelength monitor 4000 will be described. A beam of measured light "w" is transmitted through the input optical fiber 10 shown in FIG. 1. The beam of measured light "w" is then incident into the optical coupler 20 shown in FIGS. 7A and 7B. In the optical coupler 20, the beam of measured light "w1" is divided into the first and second divided beams of measured light "w1" and "w2". The first and second divided beams of measured light "w1" and "w2" are respectively transmitted through the first and second optical paths 20c and 20f that differ from each other in optical path length by ΔL. The first divided beam of measured light "w1" is emitted from the first light-emitting edge 20b. The second divided beam of measured light "w2" is emitted from the second light-emitting edge 20e. The first and second omnidirectionally-spreading divided beams of measured light "w1" and "w2" as emitted are then transmitted to the integrated tens 40-1.

The first and second omnidirectionally-spreading divided beams of measured light "w1" and "w2" are incident into the integrated lens 40-1. The first and second omnidirectionally-spreading divided beams of measured light "w1" and "w2" are uniaxially condensed by the first lens 40a in the above-described uniaxial directions only. The uniaxially condensed beams of measured light still have an uniaxial spread. The uniaxially-condensed uniaxially-spreading beams of measured light are propagated to the second lens 40b. The uniaxially-condensed uniaxially-spreading beams of measured light are uniaxially converted by the second lens 40b into the uniaxially condensed beams of measured light having no spreading in the other directions perpendicular to the predetermined unidirectional directions. The uniaxially condensed beams of measured light are propagated to the photodiode array 13.

The operations or functions of the photodiode array 13 that are shown in FIGS. 7A and 7B are the same as those in the first embodiment. The operations or functions of the first and second differential amplifiers 14 and 15 and the signal processing unit 16 that are shown in FIG. 1 but are not shown in FIGS. 7A and 7B are also the same as those of in the first embodiment. Duplicate descriptions of the operations and functions of those optical elements will be emitted.

In accordance with the fourth embodiment, the wavelength monitor 4000 includes the integrated lens 40-1 that makes it unnecessary to perform any process for optical axis alignment between the lens 12 and the condenser lens 17. Using the integrated lens 40-1 instead of the lens 12 and the condenser lens 17 shortens the time for optical axis alignment between the optical elements of the wavelength monitor 4000. The integrated lens 40-1 further simplifies the configuration of the wavelength monitor 4000. Simplification of the configuration reduces the manufacturing cost of the wavelength monitor 4000.

It is also possible as a modification to use the integrated lens 401 for the above-described wavelength monitors 1000 and 3000 in the first and third embodiments. It is further possible as another modification to exchange the positions of the first and second lenses 40a and 40b so that the second lens 40b is positioned closer to the optical coupler 20 and the first lens 40a is positioned closer to the photodiode array 13.

In accordance with the fourth embodiment, the photodiode array 13 has an emitting-edge face that is inclined by an inclination angle φ from the predetermined direction that is perpendicular to the light emitting axes of the first and second divided beams of measured light "w1" and "w2" and is further perpendicular to the alignment direction along which the first and second light emitting edges 20b and 20e of the optical coupler 20 are aligned. The two parallel beams of measured light are uniaxially condensed in the uniaxial directions that are antiparallel to each other and also parallel to the predetermined direction from which the emitting-edge face that is inclined by the inclination angle φ. The uniaxially condensed parallel beams of measured light are incident into the inclined emitting-edge face of the photodiode 13. Notwithstanding, the following modifications can alternatively be available.

In accordance with the first modification, the first lens 40a can not be used. The parallel beams of measured light are incident into the emitting edge face that is inclined by the inclination angle φ from the predetermined direction. The parallel beams of measured light are omnidirectionally parallel beams of light that are not condensed in the uniaxial directions.

In accordance with the second modification, the first lens 40a is used to uniaxially condense the beams of measured light in the uniaxial directions. The uniaxially condensed beams of measured light are then incident into the light receiving face that is not inclined. In other words, the light receiving face is inclined by zero inclination angle φ=0 from the predetermined direction parallel to the uniaxial directions.

The last-described first and second modifications provide the effects of reducing the multiple interferences. The effects are lower than that of the above-described fourth embodiment but are higher than that of the conventional one.

Fifth Embodiment

Figure 8:
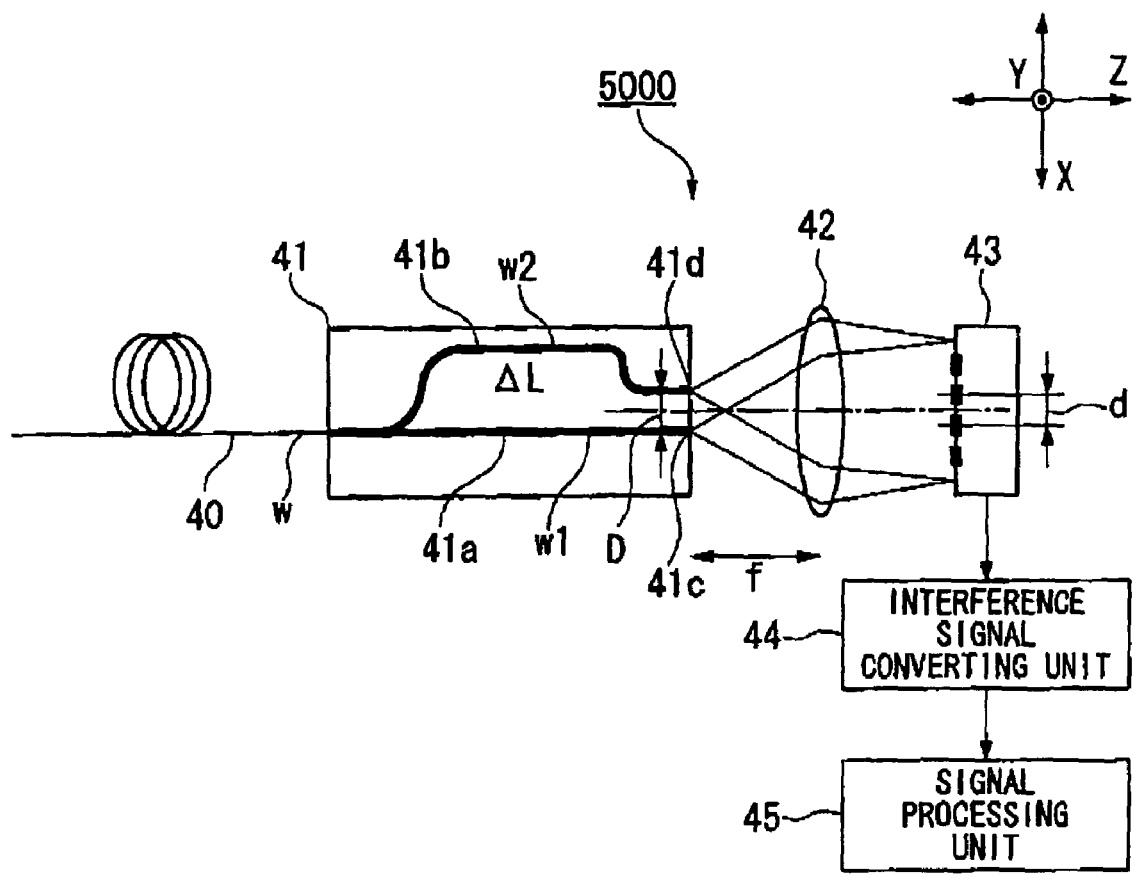
FIG. 8 is a top view illustrating a wavelength monitor in accordance with a fifth embodiment of the present invention.

A fifth embodiment of the present invention will be described with reference to FIG. 8. FIG. 8 is a top view illustrating a wavelength monitor 5000 in accordance with the fifth embodiment of the present invention. The wavelength monitor 5000 may include, but is not limited to, an input optical fiber 40, a planer lightwave circuit (PLC) substrate 41, a tens 42, and a photodiode array (PDA) 43, an interference signal converting unit 44, and a signal processing unit 45.

Figure 9:
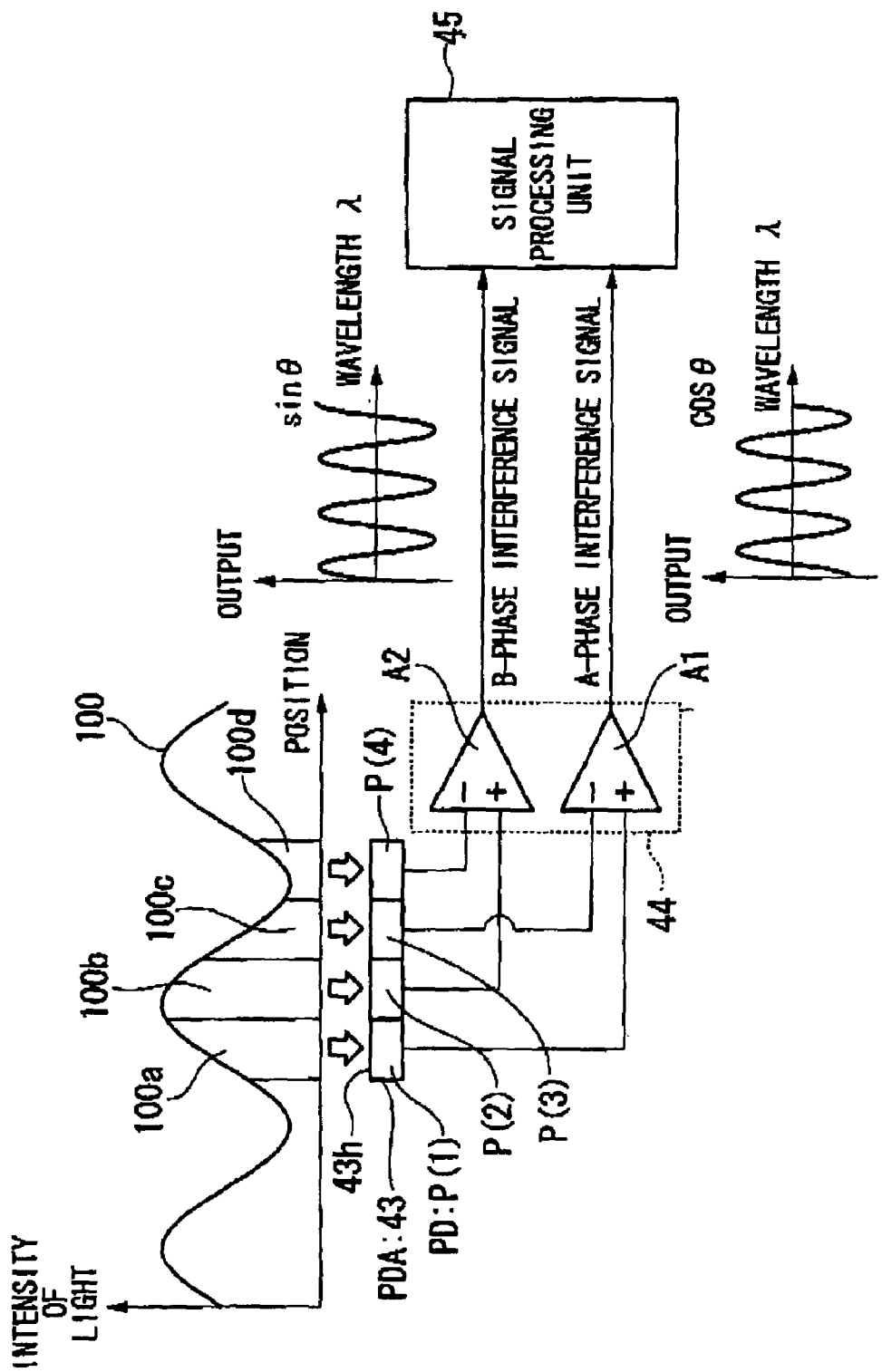
FIG. 9 is a view illustrating a photodiode army and an interference signal converting unit are included in the wavelength monitor shown in FIG. 8.

FIG. 9 is a view illustrating the photodiode array 43 and the interference signal converting unit 44 included in the wavelength monitor 5000 shown in FIG. 8. As shown in FIG. 9, the interference signal converting unit 44 includes a first subtracting circuit A1 and a second subtracting circuit A2.

A beam of measured light "w" is emitted from a laser light source that is not illustrated. The input optical fiber 40 transmits the beam of measured light "w" to the planer lightwave circuit (PLC) subs 41 that will hereinafter be referred to as a PLC substrate. The PLC substrate 41 can perform as a waveguide splitter. The PLC substrate 4H has a first optical waveguide 41a and a second optical waveguide 41b. The second optical waveguide 41b is longer in optical path length by ΔL than the first optical waveguide 41a.

The PLC substrate 41 receives the b of measured light "w" that has been transmitted from the input optical fiber 40. The PLC substrate 41 splits or divides the beam of measured light "w" into a first divided beam of measured light "w1" and a second divided beam of measured light "w2". The first divided beam of measured light "w1" is transmitted through the first optical waveguide 41a. The second divided beam of measured light "w2" is transmitted through the second optical waveguide 41b. The first and second optical waveguides 41a and 41b have first and second emitting edges 41c and 41d, respectively. The first and second emitting edges 41c and 41d are arranged in parallel to each other so that the first and second divided beams of measured light "w1" and "w2" have optical axes that are parallel to each other. The first and second divided beams of measured light "w1" and "w2" emit from the first and second emitting edges 41c and 41d toward the lens 42.

The optical fiber 40 and the PLC substrate 41 are connected to each other so that an optical path of the optical fiber 40 is tightly coupled with an optical path of the PLC substrate 41 without interposing any spatial gap between the optical paths, The first optical waveguide 41a has a first optical path length that is defined between a splitting point of the PLC substrate 41 and the first light-emitting edge 41c. The second optical waveguide 41b has a second optical path length that is defined between the splitting point and the second light-emitting edge 41d. The first and second optical path lengths are different by ΔL from each other. The first and second light-emitting edges 41c and 41d are distanced from each other by a distance "D".

The lens 42 performs as an interference optical element. The first and second divided beams of measured light "w1" and "w2" are emitted from the first and second light-emitting edges 41c and 41d, respectively. The lens 12 converts the first and second divided beams of measured light "w1" and "w2" into parallel beams of measured light. The lens 42 multiplexes or couples the parallel beams of measured light with each other to cause an interference between the parallel beams of measured light. When the lens 42 has a focal length "f", the lens 42 is distanced by the focal length "f" from each of the first and second light-emitting edges 41c and 41d.

The photodiode array 43 includes an array of ft to fourth photodiodes P(a), P(b), P(c), and P(d) that perform as light receiving elements. Each of the first to fourth photodiodes P(1), P(2), P(3), and P(4) receives a quarter period of an interference pattern that is generated by the lens 42. The first to forth photodiodes P(1), P(2), P(3), and P(4) are aligned in a direction parallel to an alignment direction along which the first and second emitting edges 41c and 414 of the PLC substrate 41 are aligned. The stripes of interference pattern are aligned in the alignment direction of the first to fourth photodiodes P(1), P(2), P(3), and P(4). The stripes of interference pattern extend in parallel to each other and along a direction perpendicular to the alignment direction of the first to four photodiodes P(1), P(2), P(3), and P(4). Each of the first to fourth photodiodes P(1), P(2), P(3), and P(4) is configured to output an electric signal that depends on the intensity of the received light. The photodiode array 43 has a periodic array of the first to fourth photodiodes P(1), P(2), P(3), and P(4). The dimension of the periodic array corresponds to a period of an optical interference pattern that is caused by the two beams of measured light. In other words, the first to fourth photodiodes P(1), P(2), P(3), and P(4) receive the optical interference pattern so that adjacent two of the first to fourth photodiodes P(1), P(2), P(3), and P(4) generate interference signals as electrical output signals, the interference signals differing in phase by 90 degrees from each other.

FIG. 9 is a schematic view illustrating a relationship between each position of the first to fourth photodiodes P(1), P(2), P(3), and P(4) shown in FIG. 8 and a light intensity profile 100 of the interference pattern generated by the two parallel beams of incident light. The reason why the light intensity profile 100 has an interference pattern of stripes is that the lens 42 couples the parallel beams of measured light, while wave fronts of the parallel beams of measured light being inclined relative to each other. Coupling or multiplexing the beams of measured light generates the light intensity profile 100 across the coupled beam of interference light as shown in FIG. 9.

In FIG. 9, an area 100a represents an interference pattern area that is received by the first photodiode P(1). An area 100b represents another interference pattern area that is received by the second photodiode P(2). An area 100c represents still another interference pattern area that is received by the third photodiode P(3). An area 100d represents yet another interference pattern area that is received by the fourth photodiode P(4).

The light receiving surface 43h of each of the first to fourth photodiodes P(1), P(2), P(3), and P(4) has a width which is so adjusted that the light receiving surface 43h receives one quarter period of the interference pattern. One period of the interference patter can be divided spatially into four quarters that are respectively received by the four light receiving surfaces 43h of the first to fourth photodiodes P(1), P(2), P(3), and P(4). The period of the interference pattern depends on the wavelength of the measured light. Preferably, the dimension of the whole alignment of the first to fourth photodiodes P(1), P(2), P(3), and P(4) corresponds to the period of the interference pattern, while the wavelength of a beam of measured light is identical to a center wavelength of the wavelength-measurable range.

Increasing the inclination angles of the wave fronts of the parallel beams of measured light that are emitted from the first and second light-emitting edges 41c and 41d narrows the pitch of the interference stripe pattern. Decreasing the inclination angles of the wave fronts of the parallel beams of measured light widens the pitch of the interference stripe pattern. Zero inclination angles of the wave fronts of the parallel beams of measured light cause a uniform intensity profile of the coupled beam of interference signal. Namely, parallel wave fronts of the parallel beams of measured light cause the uniform intensity profile. The distance between the light-emitting edges of the PLC substrate 41 and the focal length "f" of the lens 42 are adjusted in accordance with the width of the light receiving surface of each of the first to fourth photodiodes P(1), P(2), P(3), and P(4), and with the alignment pitch of the first to fourth photodiodes P(1), P(2), P(3), and P(4) as well as with the pitch of the interference stripe pattern. The dimension of the whole alignment of the first to fourth photodiodes P(1), P(2), P(3), and P(4) corresponds to the period of the interference pattern at a desired wavelength.

The first to fourth photodiodes P(1), P(2), P(3), and P(4) are aligned as described above. The first photodiode P(1) generates a first interference signal having a phase of 0 degree. The first photodiode P(1) supplies the first interference signal to a positive phase input terminal of the first subtracting circuit A1. The second photodiode P(2) generates a second interference signal having a phase of 90 degrees. The second photodiode P(2) supplies the second interference signal to a positive phase input terminal of the second subtracting circuit A2. The third photodiode P(3) generates a third interference signal having a phase of 180 degrees. The third photodiode P(3) supplies the third interference signal to a negative phase input terminal of a first subtracting circuit A1. The fourth photodiode P(4) generates a fourth interference signal having a phase of 270 degrees. The fourth photodiode P(4) supplies the fourth interference signal to a negative phase input terminal of a second subtracting circuit A2.

The reason why the light intensity profile 100 has an interference pattern of stripes is that the lens 42 couples the parallel beams of measured light, while wave fronts of the parallel beams of mea light being inclined relative to each other. Coupling or multiplexing the beams of mea light generates the light intensity profile 100 across the coupled beam of interference light as shown in FIG. 9.

The interference signal converting unit 44 includes the first and second subbing circuits A1 and A2. The first and second subtracting circuits A1 and A2 respectively generate first and second interference signals, namely A-phase and B-phase signals that are different in phase from each other. The first and second subtracting circuits A1 and A2 supply the first and second interference signals to the signal processing unit 45. The first subtracting circuit A1 receives the first and third interference signals from the first and third photodiodes P(1) and P(3). The fit subtracting circuit A1 performs a subtraction between the first and third interference signals to generate an A-phase interference signal. The first subtracting circuit A1 supplies the A-phase interference sign to the signal processing unit 16.

The second subtracting circuit A2 receives the second and fourth interference signals from the second and fourth photodiodes P(2) and P(4). The second subtracting circuit A2 performs another subtraction between the second and fourth interference signals to generate a B-phase interference signal. The second subtracting circuit A2 supplies the B-phase interference signal to the signal processing unit 16.

The A-phase interference signal and the B-phase interference signal are different in phase from each other. For example, the A-phase interference signal and the B-phase interference signal are different in phase by 90 degrees from each other when the wavelength λ is set at a center wavelength of the measurable-wavelength range. The signal processing unit 45 receives the A-phase interference signal and the B-phase interference signal from the interference signal converting unit 44.

An X-axis is set parallel to a line that interconnects the first and second light-emitting edges 41c and 41d. A Z-axis is set parallel to beams of light emitted from the first and second light-emitting edges 41c and 41d. A Y-axis is set vertical to an X-Z plane that includes the X-axis and the Z-axis.

Operations of the wavelength monitor 5000 will be described.

The optical fiber 40 transmits the beam of measured light "w" to the PLC substrate 11. The PLC substrate 11 divides the bean of measured light "w" into the first and second divided beams of measured light "w1" and "w2". The first and second divided beams of measured light "w1" and "w2" are then respectively transmitted through the first and second optical waveguides 41a and 41b differing in optical path length by ΔL. The first divided beam of measured light "w1" is emitted from the first emitting edge 41c and then propagated to the lens 42. The second divided beam of measured light "w2" is emitted from the second emitting edge 41d and then propagated to the lens 12. The first and second light-emitting edges 41c and 41d of the first and second waveguide 41a and 41b are aligned in parallel to each other at a pitch of several tens micrometers.

The lens 42 is placed on an optical axis of the emission light emitted from the PLC substrate 41. The lens 42 converts the first and second divided beams of measured light "w1" and "w2" into two parallel beams of measured light. Since the first and second light-emitting edges 41c and 41d are distanced from each other by several tens micrometers, the first and second divided beams of measured light are emitted in directions that are slightly inclined.

An optical axis of the lens 42 penetrates a center between the first and second light-emitting edges 41c and 41d. The emitting direction of each of the two parallel beams of measured light is inclined by an inclination angle θ from the optical axis of the lens 42. The inclination angle θ is given by the following equation (5).

$$\tan \theta = (D/2)/f \quad (5)$$

The emission directions of the two parallel beams of measured light differ from each other by two times the inclination angle θ. A pair of the two parallel beams of measured light has a spatial interference pattern. The paired parallel beams of measured light are propagated to the photodiode array 13 that is plate on the optical axis of the lens 42.

The period in wavelength of this interference pattern, namely a free spectral range (FSR) depends on the difference ΔL of optical path length between the first and second waveguides 41a and 41b. The f spectral range (FSR) is given by the above-described equation (3).

The first to fourth photodiodes P(1), P(2), P(3), and P(4) of the photodiode array 43 receive the coupled beam of interference light from the lens 42. The first to fourth photodiodes P(1), P(2), P(3), and P(4) generate electric signals, each depending on the optical power of the received light. The photodiode array 43 supplies each of the electric signals to the interference signal converting unit 44.

The first subtracting circuit A1 of the interference signal converting unit 44 performs a subtraction of the output of the third photodiode P(3) from the output of the first photodiode P(1), thereby generating an A-phase interference signal, The first subtracting circuit A1 supplies the A-phase interference signal to the signal processing unit 45.

The second subtracting circuit A2 of the interference signal converting unit 44 performs another subtraction of the output of the fourth photodiode P(4) from the output of the second photodiode P(2), thereby generating a B-phase interference signal. The second subtracting circuit A2 supplies the B-phase interference sign to the signal processing unit 45. Needless to day, off sets are removed from the A-phase interference signal and the B-phase interference signal.

Namely, the interference signal converting unit 44 performs a differential amplification between the interference signals having phases of 0 degree and 180 degrees from the photodiode array 43. The interference signal converting unit 44 performs another differential amplification between the interference signals having phases of 90 degrees and 270 degrees from the photodiode array 43. The interference signal converting unit 44 generates the A-phase interference signal and the B-phase interference signal. The A-phase interference signal and the B-phase interference signal are different in phase by 90 degrees or π/2 with reference to the center of zero point.

The signal processing unit 45 applies a predetermined calculating process to the A-phase interference signal and the B-phase interference signal in order to find a phase. The signal processing unit 45 calculates the wavelength λ of the beam of measured light with reference to the phase.

As described above, the PLC substrate 41 splits or divides the beam of measured light "w" into the first and second divided beams of measured light "w1" and "w2". The first and second divided beams of measured light "w1" and "w2" are propagated through the first and second waveguides 41a and 41b, respectively. The first and second divided beams of measured light "w1" and "w2" are then emitted from the first and second light-emitting edges 41c and 41d, respectively. The lens 42 converts the first and second divided beams of measured light "w1" and "w2" into the parallel beams of measured light. The parallel beams of measured light have slight inclination angles. The parallel beams of measured light are multiplexed or coupled to each other so as to cause an interference between the parallel beams of measured light.

The coupled beam of interference light is ten transmitted to the photodiode array 43. The photodiode array 43 receives the coupled beam of interference light. The parallel beams of light arm not incident into any additional optical elements. This configuration reduces the number of necessary parts or elements that consist of the wavelength monitor. The possible reduction can be obtained of the number of necessary optical elements for the wavelength monitor, thereby reducing the multiple interferences that are caused by residual reflection coefficient of the surface of an optical element. This reduction allows the wavelength monitor to measure the stable interference signal with reduced interference noise.

The optical path of the PLC substrate 41 is used as an interferometer that is mechanically stable, but is not an interferometer consisting of parallel beams of light.

The spatial period of the interference pattern or the pitch of stripes of the interference patterns depends on an angle that is defined by both the distance "D" and the focal length "f" of the lens 42. The distance "D" is defined between the first and second light-emitting edges 41c and 41d of the first and second waveguides 41a and 41b. Thus, the adjustment of the optical axis is easy.

Figure 14:
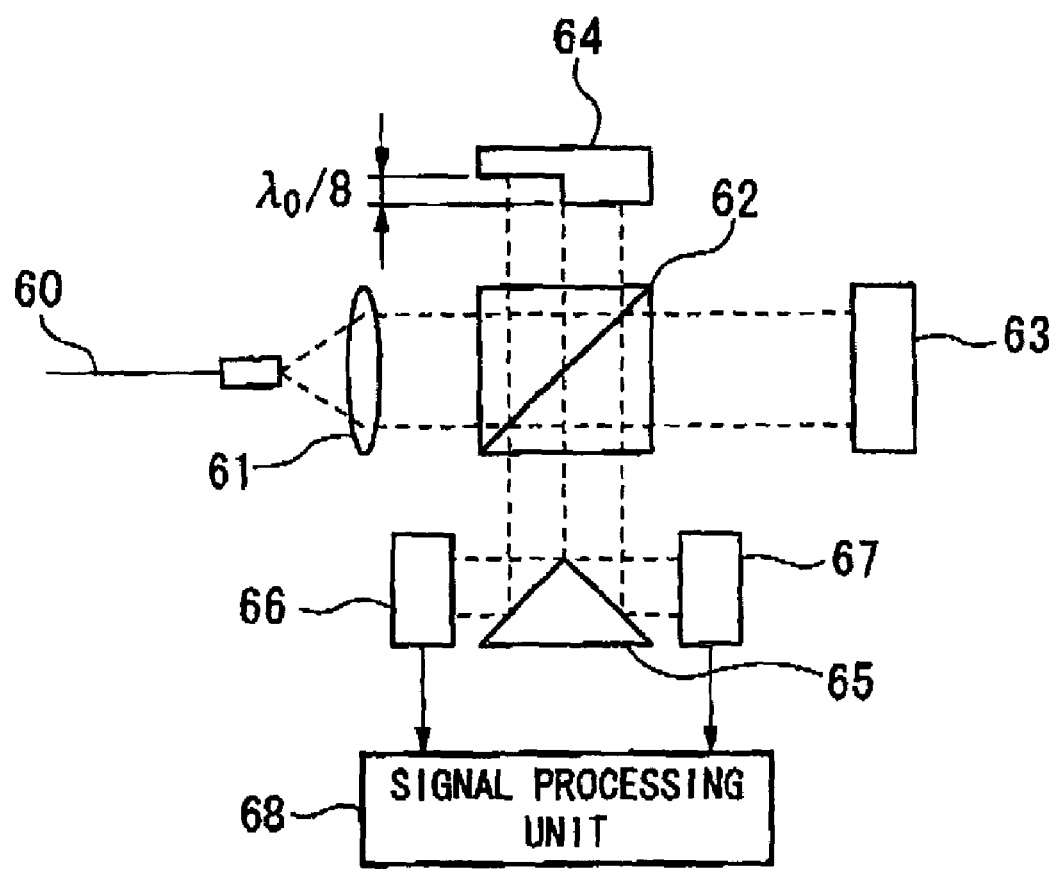
FIG. 14 is a block diagram illustrating another configuration of the conventional wavelength monitor.
Figure 15:
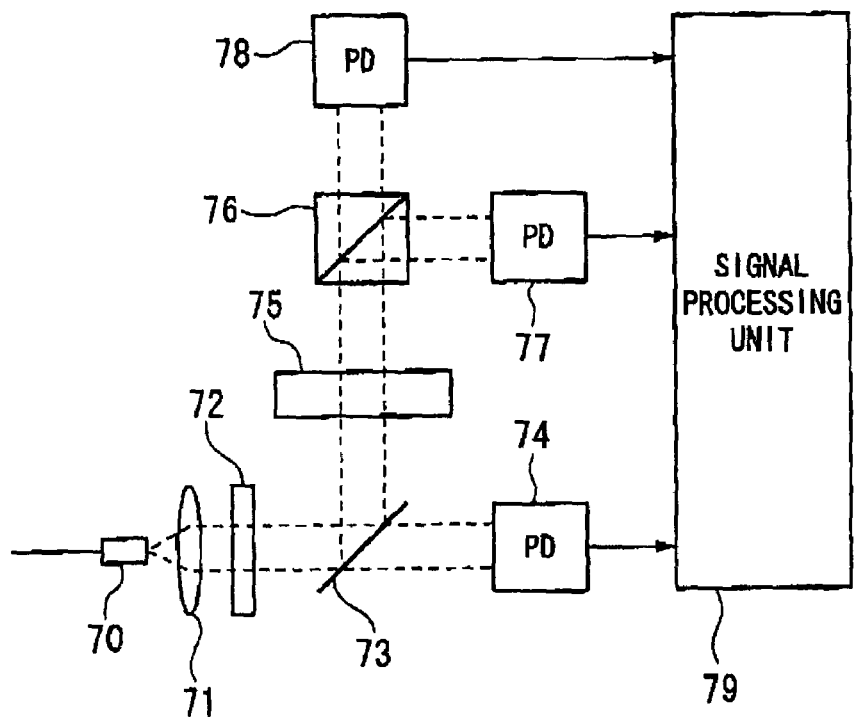
FIG. 15 is a block diagram illustrating still another configuration of the conventional wavelength monitor.
Figure 16:
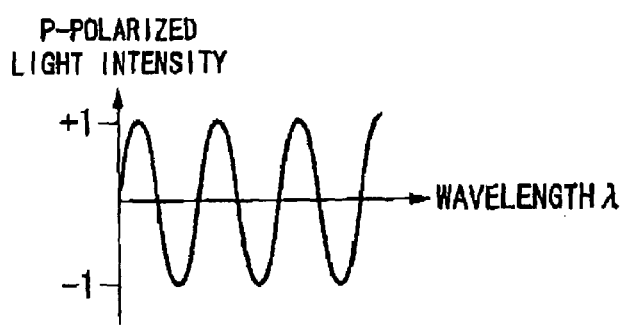
FIG. 16 is a view illustrating relationship between wavelength and intensity of each of the s-polarized light and the p-polarized light to describe the principle of measuring the wavelength by the conventional wavelength monitor shown in FIG. 15.
Figure 16:
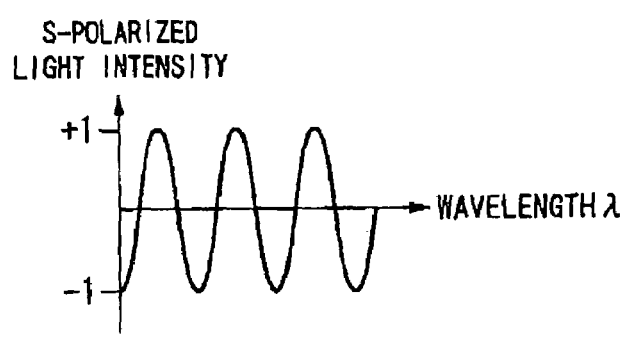

The wavelength monitor 5000 has a reduced number of the parts or elements as compared to the conventional interferometer shown in FIG. 14. The reduction of the number of the parts makes it easy to adjust the optical axis. The reduction of the number of the parts reduces the number of the manufacturing processes thereby reducing the manufacturing cost.

The wavelength monitor 5000 can advantageously be modified as follows. The photodiode array 43 includes at least the number of (4×n) of photodiodes. The photodiodes are aligned so that each of the photodiodes receives a quarter of the spatial period of the interference pattern. "n" is the natural number. Adjacent two of the photodiodes receive two quarters of the period of the interference pattern, the two quarters differing in phase by 90 degrees.

The interference signal converting unit 44 performs a first subtraction of the output of the (4×(i−1)+1)-th photodiode and the output of the (4×(i−1)+3)-th photodiode to generate a first interference signal. The inference signal converting unit 44 also performs a second subtraction of the output of the (4×(i−1)+2)-th photodiode and the output of the (4×(i−1)+4)-th photodiode to generate a second interference signal, "i" is the natural number.

For example, the interference signal converting unit 44 performs the first subtraction of the output of the first, fifth, or ninth photodiodes and the output of the third, seventh or eleventh photodiodes to generate the first interference signal. The interference signal converting unit 44 performs the second subtraction of the output of the second, sixth, or tenth photodiodes and the output of the fourth, eighth or twelfth photodiodes to generate the second interference signal.

The wavelength monitor 5000 can be modified to further include a temperature controller such as a Peltier device that controls the temperature of the PLC substrate 41 so that the PLC substrate 41 is thermally stable. The modified wavelength monitor 5000 controls the PLC substrate 41 only, wherein the PLC substrate 41 performs as an interferometer. This temperature control is more convenient as compared to the conventional wavelength monitor.

The wavelength monitor 5000 can be modified to include an optical system that has different focal lengths on X-axis and Y-axis. In this case, the lens 42 generates the uniaxially condensed beams of emitting light that are propagated along the Z-axis. The uniaxially condensed beams of emitting light have an uniaxial condensation along the Y-axis. Namely, the beams of light are condensed in the Y-axes directions only. The uniaxially condensed beams of emitting light arm not condensed along the X-axis and are uniaxially parallel in view of the Y-axis. The uniaxially condensed beams of light are coupled together. The uniaxially condensed coupled beam of light has the interference. The uniaxially condensed coupled beam of light is incident into the photodiodes PD. The uniaxially condensed coupled beam of light is condensed along the Y-axis to which the longitudinal direction of the photodiodes PD(n) is parallel.

Sixth Embodiment

Figure 10:
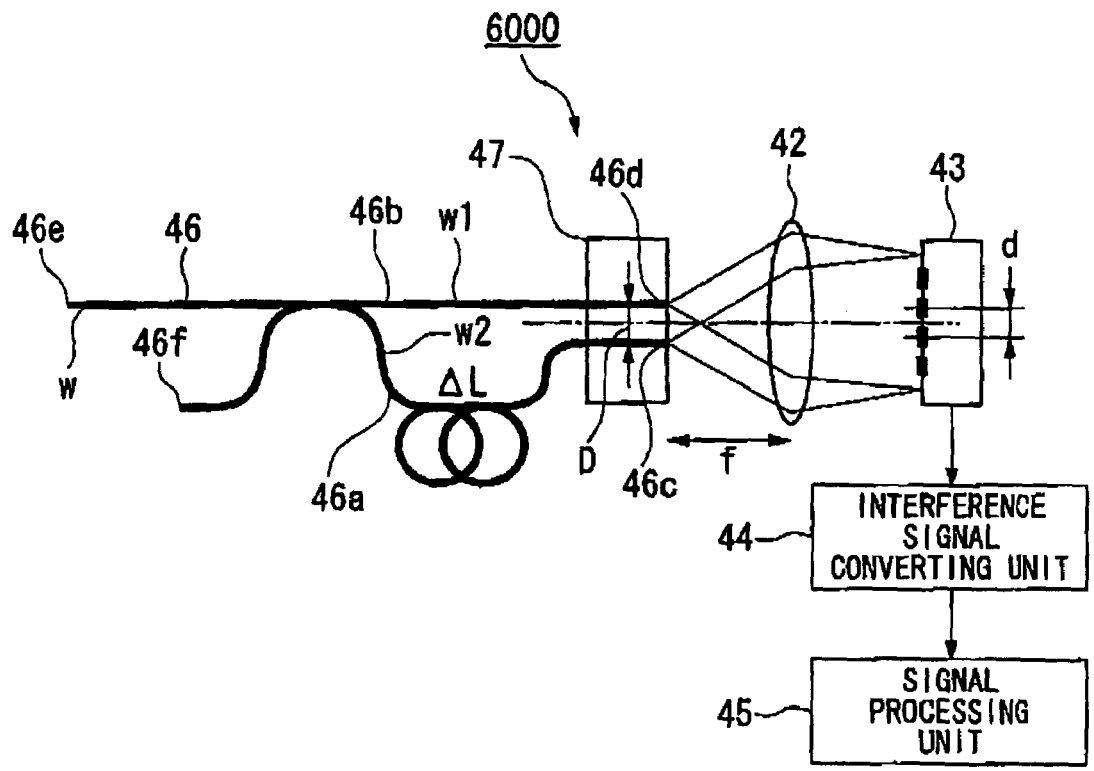
FIG. 10 is a top view illustrating a wavelength monitor in accordance with a sixth embodiment of the present invention.

A sixth embodiment of the present invention will be described with reference to FIG. 10. FIG. 10 is a top view illustrating a wavelength monitor 6000 in accordance with the sixth embodiment of the present invention. In FIG. 10, the same elements as shown in FIGS. 9A and 9B are allocated with the same reference numbers. Duplicate descriptions of the same elements are omitted. As shown in FIG. 10, the wavelength monitor 6000 of the sixth embodiment is different in configuration from the wavelength monitor 5000 of the fifth embodiment. An optical coupler 46 is provided instead of the PLC substrate 41. The optical coupler 46 includes optical fibers. The optical coupler 46 has two inputs and two outputs.

The optical coupler 46 can be realized by a waveguide splitter. The optical coupler 46 includes a first optical path 46b and a second optical path 46a. The first optical path 46b has a first light-incident edge 46e and a first light-emitting edge 46d. The second optical path 46a has a second light-incident edge 46f and a second light-emitting edge 46c. The first light-incident edge 46e is connected with an input optical fiber 40 that is shown in FIG. 8.

The second light-incident edge 46f is antireflection-coated. The optical coupler 46 splits or divides a beam of measured light into first and second divided beams of measured light "w1" and "w2". The first and second divided beams of measured light "w1" and "w2" are propagated through the first and second optical paths "w1" and "w2". The first and second optical paths 46b and 46a are different in optical path length from each other. The first and second optical paths 46b and 46a are configured by waveguides. The first and second optical paths 46b and 46a are emitted from the first and second light emitting edges 46d and 46c, respectively. The first and second light-emitting edges 46d and 46c have first and second optical axes that are parallel to each other. The first and second light emitting edges 46d and 46c are aligned in parallel to each other.

The first optical path 46b has a first optical path length that is defined between a splitting point of the optical coupler 46 and the first light-emitting edge 46d. The second optical path 46a has a second optical path length that is defined between the splitting point and the second light-emitting edge 46c. The first and second optical path lengths are different by ΔL from each other. The first and second light-emitting edges 46d and 46c are distanced by a distance D. A distance between the first light-emitting edge 46d and the lens 42 is equal to a focal length f of the lens 42. A distance between the second light-emitting edge 46c is equal to the focal length f of the lens 42.

A V-grooved substrate 47 has two V-shaped grooves that extend in parallel to optical axes of emitting edges of the optical coupler 46. The first and second light-emitting edges 46d and 46c of the optical coupler 46 are mechanically fixed by the two V-shaped grooves.

Operations of the wavelength monitors 6000 will be described.

The beam of measured light "w" is transmitted through the input optical fiber 40 to the optical coupler 46. In the optical coupler 46, the beam of measured light "w" is divided into the first and second divided beams of measured light "w1" and "w2". The first and second divided beams of measured light "w1" mid "w2" are propagated through the first and second optical paths 46b and 46a, respectively. The first and second optical paths 46b and 46a are different in optical path length by ΔL from each other. The first and second divided beams of measured lip "w1" and "w2" are emitted from the first and second light-emitting edges 46d and 46c. The first and second divided beams of measured light "w1" and "w2" as emitted are then propagated to the lens 42.

The first light-emitting edge 46d of the first optical path 46b and the second light-emitting edge 46c of the second optical path 46a are held by the V-grooved substrate 47. The first light-emitting edge 46d and the second light-emitting edge 46c are aligned in parallel to each other. The first light-emitting edge 46d and the second light-emitting edge 46c are distanced at a pitch D.

The lens 42 is placed on the optical axes of the beans of light emitted from the optical coupler 46. The optical coupler 46 is held by the V-grooved substrate 47. The first and second divided beams of mewed light "w1" and "w2" are propagated from the optical coupler 46 to the lens 42. The first and second divided beams of measured light "w1" and "w2" are converted by the lens 42 into the parallel beams of measured light. The parallel beams of measured light are further coupled and interfered with each other by the lens 42 to generate a coupled beam of interfered light. The coupled beam of interfered light is then incident into the photodiode way 43. Operations of the photodiode array 43, the interference signal converting unit 44, and the signal processing unit 45 are the same as those in the fifth embodiment. Duplicate descriptions of the operations of those elements will be omitted.

The optical coupler 46 including the optical fibers is used as a beam splitter. Using the optical coupler 46 including the optical fibers is suitable for enlarging the difference ΔL in optical path length between the first and second optical paths 46b and 46a. The enlargement of the difference ΔL can improve the wavelength resolution of the wavelength monitor.

The wavelength monitor 6000 can advantageously be modified as follows. The photodiode array 43 includes at least the number of (4×n) of photodiodes. The photodiodes are aligned so that each of the photodiodes receives a quarter of the spatial period of the interference pattern. "n" is the natural number. Adjacent two of the photodiodes receive two quarters of the period of the interference pattern, the two quarters differing in phase by 90 degrees.

The interference signal converting unit 44 performs a first subtraction of the output of the (4×(i−1)+1)-th photodiode and the output of the (4×(i−1)+3)-th photodiode to generate a first interference signal. The interference signal converting unit 44 also performs a second subtraction of the output of the (4×(i−1)+2)-th photodiode and the output of the (4×(i−1)+4)-th photodiode to generate a second interference signal. "i" is the natural number.

For example, the interference signal converting unit 44 performs the first subtraction of the output of the first, fifth, or ninth photodiodes and the output of the third, seventh or eleventh photodiodes to generate the first interference signal. The interference signal converting unit 44 performs the second subtraction of the output of the second, sixth or tenth photodiodes and the output of the fourth, eighth or twelfth photodiodes to generate the second interference signal.

The wavelength monitor 6000 can be modified to further include a concave reflecting mirror instead of the lens 42. The photodiode array 43 is interposed between the V-grooved substrate 47 and the concave reflecting mirror in the top view.

The wavelength monitor 6000 can be modified to include an optical system that has different focal lengths on X-axis and Y-axis. In this case, the lens 42 generates the uniaxially condensed beams of emitting light that are propagated along the Z-axis. The uniaxially condensed beams of emitting light have an uniaxial condensation along the Y-axis. Namely, the beams of light ale condensed in the Y-axes directions only. The uniaxially condensed beams of emitting light are not condensed along the X-axis and are uniaxially parallel in view of the Y-axis. The uniaxially condensed beams of light are coupled together. The uniaxially condensed coupled beam of light has the interference. The uniaxially condensed coupled beam of light is incident into the photodiodes PD. The uniaxially condensed coupled beam of light is condensed along the Y-axis to which the longitudinal direction of the photodiodes PD(n) is parallel.

Seventh Embodiment

Figure 11:
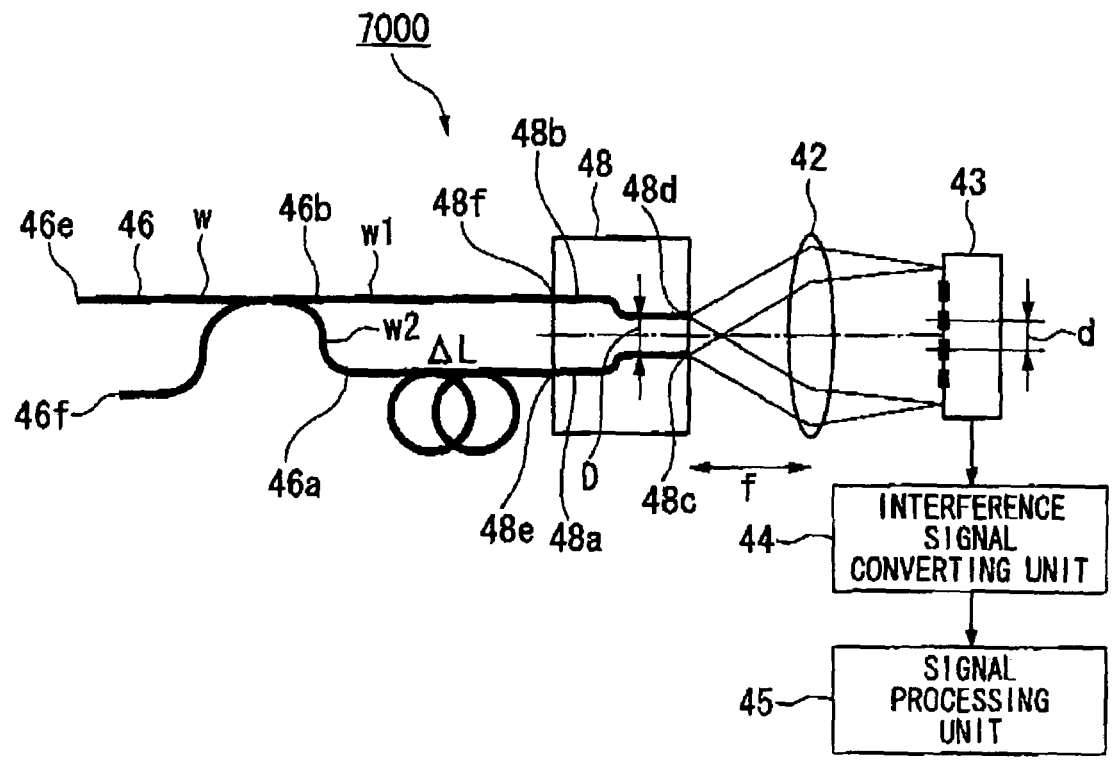
FIG. 11 is a top view illustrating a wavelength monitor in accordance with the seventh embodiment of the present invention.

A seventh embodiment of the present invention will be described with reference to FIG. 11. FIG. 11 is a top view illustrating a wavelength monitor 7000 in accordance with the seventh embodiment of the present invention. In FIG. 11, the same elements as shown in FIG. 10 are allocated with the same reference numbers. Duplicate descriptions of the same elements are omitted. As shown in FIG. 11, the wavelength monitor 7000 of the seventh embodiment is different in configuration from the wavelength monitor 6000 of the sixth embodiment. A pitch changing element 48 is newly provided between the optical coupler 46 and the lens 42. The V-grooved substrate 47 is not provided.

The pitch changing unit 48 can be realized by a PLC substrate. The PLC substrate includes first and second optical paths 48b and 48a. The first optical path 48b has a first light-incident edge 48f and a first light-emitting edge 48d. The second optical path 48a has a second light-incident edge 48e and a second light-emitting edge 48c. The first and second optical paths 48b and 48a have the same optical path length as each other. The first and second light-emitting edges 48d and 48c are placed in parallel to each other. The pitch changing unit 48 has optical axes of lift emitted from the first and second light-emitting edges 48d and 48c. The pitch changing unit 48 is also configured to allow the divided beams of measured light to be emitted from the first and second light-emitting edges 48d and 48c.

The optical coupler 46 and the pitch caging unit 48 are tightly connected without forming any spatial gap between them and on the optical paths of the measured light. For example, the first optical path 46b and the first optical path 48b are tightly connected without forming any spatial gap between them. The first optical paw 46a and the first optical path 48a are tightly connected without forming any spatial gap between them. A distance between the first light-emitting edge 48d and the lens 42 is equal to the focal length of the lens 42. A distance between the second light-emitting edge 48c and the lens 42 is equal to the focal length "f" of the lens 42. A distance D between the first and second light-emitting edges 48d and 48c of the wavelength monitor 7000 is narrower than another distance D between the first and second light-emitting edges 46d and 46c of the wavelength monitor 6000. The distance D between the first and second light-emitting edges 48d and 48c of the wavelength monitor 7000 can, for example, be narrower man a diameter of the optical fibers of the optical coupler 46 and the pitch changing unit 48.

Operations of the wavelength monitors 7000 will be described.

The divided beams of measured light are emitted from the pitch changing unit 48. The divided beams of measured light are transmitted to the lens 42 that is placed on the optical axes of light emitted from the pitch changing unit 48. The divided beams of measured light are converted into parallel beams of measured light by the lens 42.

In the optical coupler 46, the beam of measured light "w" is divided into the first and second divided beams of measured light "w1" and "w2". The first and second divided beams of measured light "w1" and "w2" are propagated through the first and second optical paths 46b and 46a to the first and second light-incident edges 48f and 48e, respectively. The first and second divided beams of measured light "w1" and "w2" are propagated through the first and second optical paths 48b and 48a of the pitch changing element 48. The first and second divided beams of measured light "w1" and "w2" are emitted from the first and second light-emitting edges 48d and 48c of the pitch changing element 48. The first and second divided beams of measured light "w1" and "w2" as emitted are then propagated to the lens 42 that is placed on the optical axes of light emitted from the pitch changing element 48.

The first and second divided beams of measured light "w1" and "w2" are converted into the parallel beams of measured light by the lens 42. The parallel beams of measured light are then incident into the photodiodes array 43. Operations of the photodiode array 43, the interference signal converting unit 44, and the signal processing unit 45 are the same as those in the sixth embodiment. Duplicate descriptions of the operations of those elements will be omitted.

The pitch changing element 48 changes or converts the pitch or distance D between the first and second light-emitting edges 48d and 48c of the optical coupler 46. As compared to the first and second light emitting edges 46c and 46d of the optical fibers shown in FIG. 10, using the pitch changing element 48 makes it easy to adjust the distance D between the first and second light-emitting edges 48d and 48c. In other words, using the pitch changing element 48 makes it easy to adjust the positions of the first and second light-emitting edges 48d and 48c.

It is physically difficult to set a narrower pitch D between the light-emitting edges of the two optical fibers, the narrower pitch being narrower than the diameter of the optical fibers. Using the pitch changing element 48 makes it easy to set the narrower pitch D between the first and second light-emitting edges, the narrower pitch being narrower than the diameter of the optical fibers. Narrowing the pitch D between the first and second light-emitting edges allows the focal length of the lens 42 to be shortened. Shortening the focal length of the lens 42 allows for scaling down the optical module and increases the intensity of light incident into the photodiode array 43.

For example, it is assumed that the photodiode array has an array of light receiving elements, adjacent two of which are distanced by 80 micrometers, and that the two light-emitting edges have a pitch of 125 micrometers which is equal to the diameter of the optical fiber. In this case, the less 42 needs to have a focal length of 25.8 millimeters so that a set of four light receiving elements of the photodiode array 43 receives the spatial period of the interference pattern. Using the pitch changing element 48 allows for setting the pitch of 50 micrometers between the light-emitting edges. Setting the pitch of 50 micrometers allows that the lens 42 has a focal length of 10.3 millimeters, thereby scaling down the wavelength monitor.

The wavelength monitor 7000 can advantageously be modified as follows. The photodiode array 43 includes at least the number of (4×n) of photodiodes. The photodiodes are aligned so that each of the photodiodes receives a quarter of the spatial period of the interference pattern. "n" is the natural number. Adjacent two of the photodiodes receive two quarters of the period of the interference pattern, the two quarters differing in phase by 90 degrees.

The interference signal converting unit 44 performs a first subtraction of the output of the (4×(i−1)+1)-th photodiode and the output of the (4×(i−1)+3)-th photodiode to generate a first interference signal. The interference signal converting unit 44 also performs a second subtraction of the output of the (4×(i−1)+2)-th photodiode and the output of the (4×(i−1)+4)-th photodiode to generate a second interface signal. "i" is the natural number.

For example, the interference signal converting unit 44 performs the first subtraction of the output of the first, fifth or ninth photodiodes and the output of the third, seventh or eleventh photodiodes to generate the first interference signal. The interference signal converting unit 44 performs the second subtraction of the output of the second, sixth, or tenth photodiodes and the output of the fourth, eighth or twelfth photodiodes to generate the second interference signal.

The wavelength monitor 7000 can include other waveguide element instead of the combination of the pitch changing element 48 with the optical coupler 46. Typical example of the other waveguide element may be fusion-spliced optical fibers that have light-emitting edges. The light-emitting edges are distanced by a pitch D that is narrower than the diameter of the optical fibers.

The wavelength monitor 7000 can be modified to further include a concave reflecting mirror instead of the lens 42. The photodiode array 43 is interposed between the V-grooved substrate 47 and the concave reflecting mirror in the top view.

The wavelength monitor 7000 can be modified to include an optical system that has different focal lengths on X-axis and Y-axis. In this case, the lens 42 generates the uniaxially condensed beams of emitting light that are propagated along the Z-axis. The uniaxially condensed beams of emitting light have an uniaxial condensation along the Y-axis. Namely, the beams of light are condensed in the Y-axes directions only. The uniaxially condensed beams of emitting light are not condensed along the X-axis and are uniaxially parallel in view of the Y-axis. The uniaxially condensed beams of light are coupled together. The uniaxially condensed coupled beam of light has the interference. The uniaxially condensed coupled beam of light is incident into the photodiodes PD. The uniaxially condensed coupled beam of light is condensed along the Y-axis to which the longitudinal direction of the photodiodes PD(n) is parallel.

Eighth Embodiment

Figure 12A:
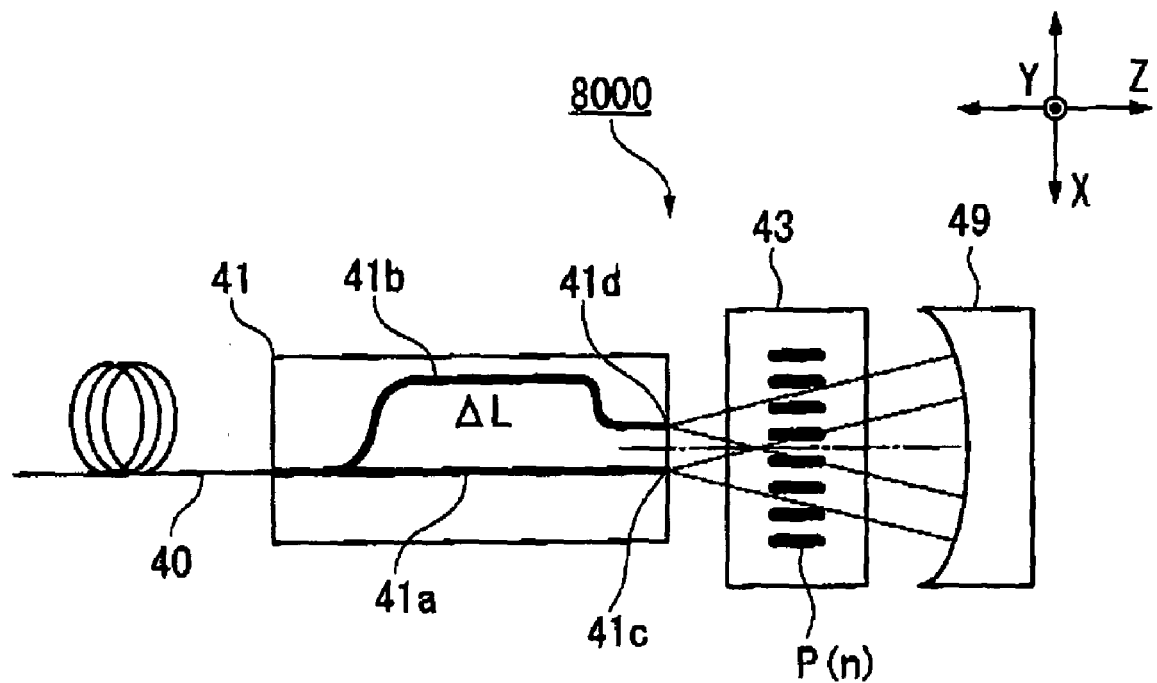
FIG. 12A is a top view illustrating a wavelength monitor in accordance with the eighth embodiment of the present invention.
Figure 12B:
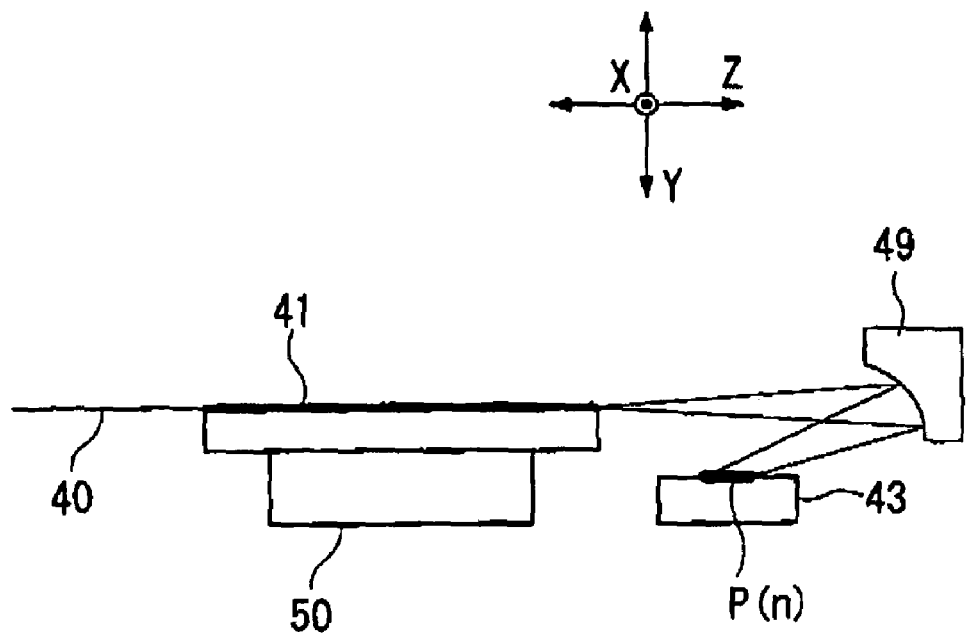
FIG. 12B is a side view illustrating the wavelength monitor shown in FIG. 12A.
Figure 13:
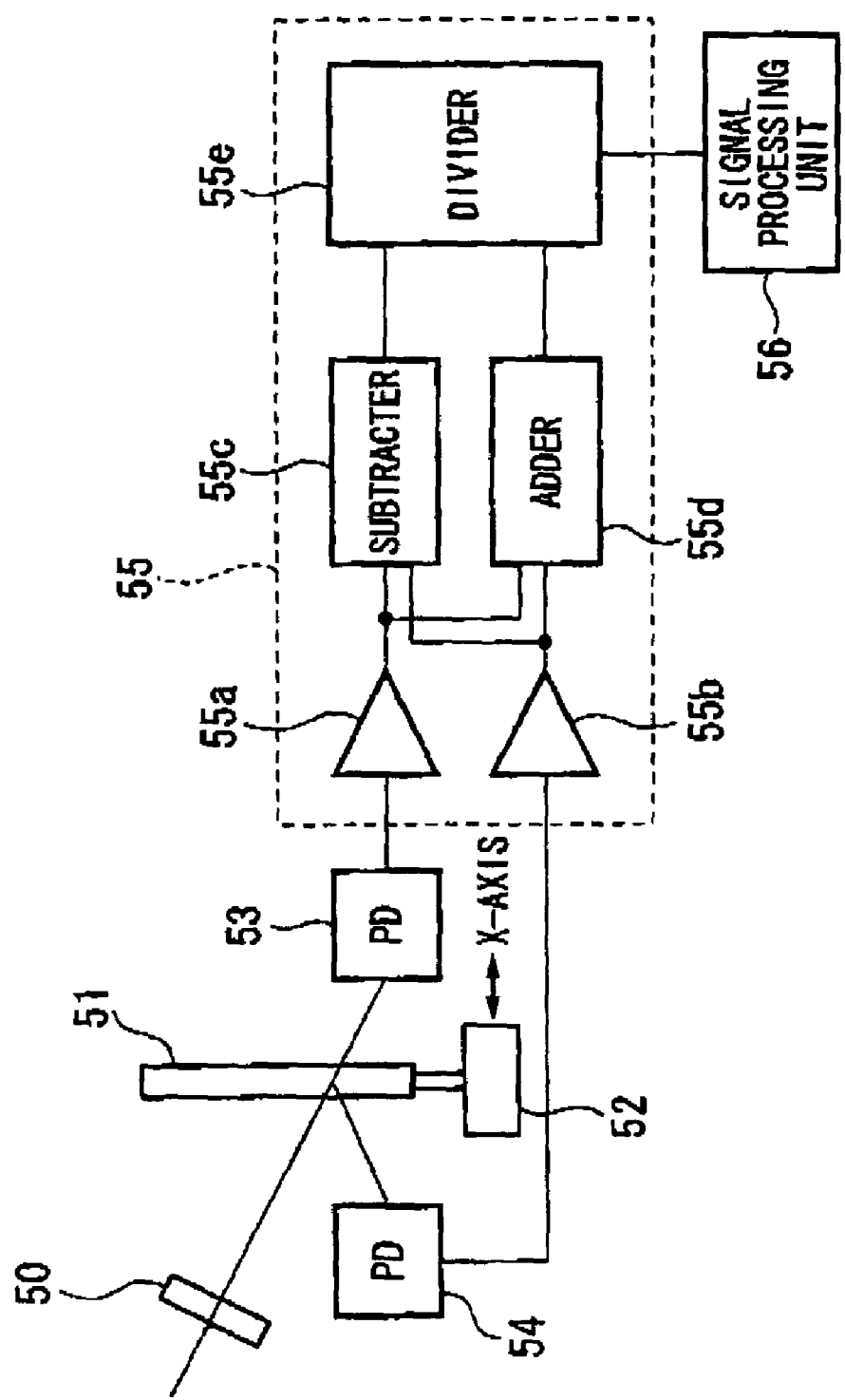
FIG. 13 is a block diagram illustrating a configuration of the conventional wavelength monitor.

An eighth embodiment of the present invention will be described with reference to FIGS. 12A and 12B. FIG. 12A is a top view illustrating a wavelength monitor 8000 in accordance with the eighth embodiment of the present invention FIG. 12B is a side view illustrating the wavelength monitor 8000 shown in FIG. 12A. In FIGS. 12A and 12B, the same elements as shown in FIG. 8 are allocated with the same reference numbers. Duplicate descriptions of the same elements are omitted. As shown in FIGS. 12A and 12B, the wavelength monitor 8000 of the eighth embodiment is different in configuration from the wavelength monitor 5000 of the fifth embodiment. A concave reflecting mirror 49 is provided instead of the lens 42. In the top view, the photodiode array 43 is interposed between the concave reflecting mirror 49 and the PLC substrate 41. The concave reflecting mirror 49 performs as an interfering element. The concave reflecting mirror 49 reflects the divided beams of measured light that have been emitted from the first and second light-emitting edges 41d and 41c of the PLC substrate 41. The reflected beams of measured light are parallel beams of measured light. The reflected parallel beams of measured light are then coupled with each other to cause an interference between them. The wavelength monitor 8000 includes the interference signal converting unit 44 and the signal processing unit 45, both of which are not illustrated in FIGS. 12A and 12B.

The photodiode array 43 has a single alignment of photodiodes P(n), the number of which is n. Each of the photodiodes P(n) has a generally rectangle shape. The concave reflecting mirror 49 has different focal lengths on an X-axis and a Y-axis. The X-axis is parallel to an alignment direction of the first and second light-emitting edges 41d and 41c. The concave reflecting mirror 49 converts the divided beams of measured light into uniaxially parallel beams of measured light. The uniaxially parallel beams of measured light have a beam-shape that is uniaxially parallel, relative to the X-axis that is parallel to the alignment direction of the photodiodes P(n). Namely, the beams have a uniform size in the X-axis.

Operations of the wavelength monitor 8000 will be described.

The divided beams of measured light are emitted from the PLC substrate 41. The divided beams of measured light are propagated to the concave reflecting mirror 49 that is placed on the optical axis of light emitted from the PLC substrate 41. The divided beams of measured light are reflected by the concave reflecting mirror 49. The reflected beams of measured light are uniaxially parallel. The reflected beams of measured light are then propagated to the photodiode array 43. Since the first and second light-emitting edges 41d and 41c are distanced from each other by several tens micrometers, the divided beams of measured light are emitted from the first and second light-emitting edges 41d and 41c in emitting directions that are slightly inclined to each other, thereby causing an interference between the divided beams of measured light. The photodiode array 43 receives the beam of interference light that are propagated from the concave reflecting mirror 49. Other operations of the wavelength monitor 8000 are the same as those of the wavelength monitor 5000 shown in FIG. 8.

The concave reflecting mirror 49 reflects the divided beams of measured light to the photodiode array 43, wherein the divided beams of measured light have been transmitted from the PLC substrate 41. The absence of the lens 42 means that the wavelength of the beam of measured light does not depend on the material of the lens 42. No wavelength dependency causes no variation of the focal length of the optical system. The absence of the lens 42 causes no generation of the multiple interference on the lens 42. The multiple interferences are generated due to the residual reflection coefficient of the surface of an optical element. The wavelength monitor 8000 free of the lens 42 can suppress the multiple interferences and can measured the stable interference sisal with a reduced interference noise, as compared to the wavelength monitor 5000 shown in FIG. 8.

The wavelength monitor 8000 can advantageously be modified as follows. The photodiode array 43 includes at least the number of (4×n) of photodiodes. The photodiodes are aligned so that each of the photodiodes receives a quarter of the spatial period of the interference pattern. "n" is the natural number. Adjacent two of the photodiodes receive two quarters of the period of the interference pattern, the two quarters differing in phase by 90 degrees.

The interference signal converting unit 44 performs a first subtraction of the output of the (4×(i−1))-th photodiode and the output of the (4×(i−1)+3)-th photodiode to generate a first interference signal. The interference signal converting unit 44 also performs a second subtraction of the output of the (4×(i−1)+2)-th photodiode and the output of the (4×(i−1)+4)-th photodiode to generate a second interference signal. "i" is the natural number.

For example, the interference signal converting unit 44 performs the first subtraction of the output of the first, fifth, or ninth photodiodes and the output of the third, seventh or eleventh photodiodes to generate the first interference signal. The interference signal converting unit 44 performs the second subtraction of the output of the second, sixth, or tenth photodiodes and the output of the fourth, eighth or twelfth photodiodes to generate the second interference signal.

The wavelength monitor 8000 can be modified to further include a temperature controller such as a Peltier device that controls the temperature of the PLC substrate 41 so that the PLC substrate 41 is thermally stable. The modified wavelength monitor 8000 controls the PLC substrate 41 only, wherein the PLC substrate 41 performs as an interferometer. This temperature control is more convenient as compared to the conventional wavelength monitor.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wavelength monitor comprising:
    an optical divider including at least first and second light-emitting edges that are aligned in a first direction, the optical divider dividing a beam of measured light into at least first and second divided beams of measured light, the optical divider allowing the first and second divided beams of measured light to be emitted in a second direction from the first and second light-emitting edges, respectively;
    a first optical element that converts the first and second divided beams of measured light into first and second parallel beans of measured light;
    a second optical element that uniaxially condenses the first and second parallel beams of measured light in a third direction, the third direction being perpendicular to the first and second directions;
    a photoelectric converter including a plurality of light receiving elements, the plurality of light receiving elements receiving first and second uniaxially condensed beams of measured light from the second optical element, the plurality of light receiving elements being aligned in the first direction so that each of the plurality of light receiving elements receives an equally-divided one of the period of an interference pattern, the interference pattern being caused by an interference between the first and second uniaxially condensed beams of measured light, each of the plurality of light receiving elements generating an electrical signal that depends on an intensity of the equally-divided one of the period of the interference pattern, each of the plurality of light receiving elements having a light-receiving surface that is inclined relative to the third direction; and
    a signal processing unit that receives the electrical signals outputted from the plurality of light-receiving elements, the signal processing unit obtaining a wavelength of the measured light from the electrical signals.

2. The wavelength monitor according to claim 1, wherein the light-receiving surface is inclined relative to the third direction by an inclination angle φ that satisfies the following equation:

$$90°>\phi\geq\mathrm{Tan}^{-1}(r/f_2)$$

where r is a radius of the first and second parallel beams of measured light, and $f_2$ is a focal length of the second optical element.

3. The wavelength monitor according to claim 1, wherein the first and second optical elements are integrated together.

4. The wavelength monitor according to claim 1, wherein the photoelectric converter is placed so that the light-receiving surface is positioned at a focal position of the first and second uniaxially condensed beams of measured light, the focal position is defined by a combination of the first and second optical elements.

5. The wavelength monitor according to claim 1, wherein the optical divider comprises a planer lightwave circuit substrate.

6. The wavelength monitor according to claim 1, wherein the optical divider comprises an optical coupler.

7. The wavelength monitor according to claim 6, wherein the optical coupler comprises a plurality of optical fibers, and further comprising: a pitch changing element that provides a pitch narrower than a diameter of the plurality of optical fibers, the pitch being defined between the first and second light emitting edges of the optical coupler.

8. The wavelength monitor according to claim 7, wherein the pitch changing element comprises a planer lightwave circuit substrate.

9. The wavelength monitor according to claim 7, wherein the pitch changing element comprises fusion-spliced optical fibers.

10. The wavelength monitor according to claim 1, wherein the light-receiving surface is inclined relative to the third direction on the basis of the focal length of the second optical element.

11. A wavelength monitor comprising:
an optical divider including at least first and second light-emitting edges that are aligned in a first direction, the optical divider dividing a beam of measured light into at least first and second divided beams of measured light, the optical divider allowing the first and second divided beams of measured light to be emitted in a second direction from the first and second light-emitting edges, respectively;
a first optical element that converts the first and second divided beams of measured light into first and second parallel beams of measured light;
a second optical element that uniaxially condenses the first and second parallel beams of measured light in a third direction, the third direction being perpendicular to the first and second directions;
a photoelectric converter including a plurality of light receiving elements, the plurality of light receiving elements receiving first and second uniaxially condensed beams of measured light from the second optical element, the plurality of light receiving elements being aligned in the first direction so that each of the plurality of light receiving elements receives an equally-divided one of the period of an interference pattern, the interference pattern being caused by an interference between the first and second uniaxially condensed beams of measured light, each of the plurality of light receiving elements generating an electrical signal that depends on an intensity of the equally-divided one of the period of the interference pattern; and
a signal processing unit that receives electric signals outputted from the plurality of light-receiving elements, the signal processing unit obtaining a wavelength of the measured light.

12. An optical system comprising:
an optical divider including at least first and second light-emitting edges that are aligned in a first direction, the optical divider having unequal beam paths and dividing a beam of measured light into at least first and second divided beams of measured light, the optical divider allowing the first and second divided beams of measured light to be emitted in a second direction from the first and second light-emitting edges, respectively;
a first optical element that converts the first and second divided beams of measured light into first and second parallel beams of measured light;
a second optical element that uniaxially condenses the first and second parallel beams of measured light in a third direction, the third direction being perpendicular to the first and second directions; and
a photoelectric converter that receives first and second uniaxially condensed beams of measured light from the second optical element to generate electrical signals that depend on intensities of the first and second uniaxially condensed beams of measured light, the photoelectric converter having a light-receiving surface that is inclined relative to the third direction.

13. The optical system according to claim 12, wherein the light-receiving surface is inclined relative to the third direction by an inclination angle $\phi$ that satisfies the following equation:

$$90° > \phi \geq \tan^{-1}(r/f_2)$$

where r is a radius of the first and second parallel beams of measured light, and $f_2$ is a focal length of the second optical element.

14. The optical system according to claim 12, wherein the photoelectric converter includes a plurality of light receiving elements that are aligned in the first direction so that each of the plurality of light receiving elements receives an equally-divided one of the period of an interference pattern, the interference pattern being caused by an interference between the first and second uniaxially condensed beams of measured light.

15. The optical system according to claim 14, wherein the light-receiving surface of the photoelectric converter is inclined relative to the third direction on the basis of the focal length of the second optical element.

16. An optical system comprising:
an optical divider including at least first and second light-emitting edges that are aligned in a first direction, the optical divider having unequal beam paths and dividing a beam of measured light into at least first and second divided beams of measured light, the optical divider allowing the first and second divided beams of measured light to be emitted in a second direction from the first and second light emitting edges, respectively;
a first optical element that converts the first and second divided beams of measured light into first and second parallel beams of measured light;
a second optical element that uniaxially condenses the first and second parallel beams of measured light in a third direction, the third direction being perpendicular to the first and second directions; and
a photoelectric converter that receives first and second uniaxially condensed beams of measured light from the second optical element to generate electrical signals that depend on intensities of the first and second uniaxially condensed beams of measured light.

17. The optical system according to claim 16, wherein the photoelectric converter includes a plurality of light receiving elements that are aligned in the first direction so that each of the plurality of light receiving elements receives an equally-divided one of the period of an interference pattern, the interference pattern being caused by an interference between the first and second uniaxially condensed beams of measured light.

* * * * *